United States Patent
Joshi et al.

(10) Patent No.: US 12,348,671 B2
(45) Date of Patent: *Jul. 1, 2025

(54) FRAUDULENT CALL DETECTION

(71) Applicant: McAfee, LLC, San Jose, CA (US)

(72) Inventors: Harsha Ramamurthy Joshi, Bangalore (IN); Purnima Tammireddy, Bangalore (IN); Pavan Kumar Podila, Bangalore (IN)

(73) Assignee: McAfee, LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/419,141

(22) Filed: Jan. 22, 2024

(65) Prior Publication Data

US 2024/0187517 A1 Jun. 6, 2024

Related U.S. Application Data

(63) Continuation of application No. 17/384,645, filed on Jul. 23, 2021, now Pat. No. 11,882,239.

(30) Foreign Application Priority Data

May 19, 2021 (IN) .............................. 202141022415

(51) Int. Cl.
*H04M 3/42* (2006.01)
*G06N 20/00* (2019.01)
(Continued)

(52) U.S. Cl.
CPC ........ *H04M 3/42085* (2013.01); *G06N 20/00* (2019.01); *G10L 15/02* (2013.01);
(Continued)

(58) Field of Classification Search
CPC ..... H04M 3/42085; H04M 2203/6027; H04M 3/42221; H04M 2203/556; H04M 3/38;
(Continued)

(56) References Cited

U.S. PATENT DOCUMENTS

| 7,236,954 B1 * | 6/2007 | Marchand | G06Q 40/08 455/406 |
| 7,783,019 B2 * | 8/2010 | Mahone | H04L 63/1408 709/225 |

(Continued)

FOREIGN PATENT DOCUMENTS

| GB | 2584827 A | * | 12/2020 | ............. | G06F 40/30 |
| KR | 2105059 B1 | * | 4/2020 | ............. | G10L 15/26 |

*Primary Examiner* — Akelaw Teshale
(74) *Attorney, Agent, or Firm* — Patent Capital Group

(57) ABSTRACT

There is disclosed in one example a mobile telephone, including: a hardware platform including a processor and a memory; a telecommunication transceiver; and instructions encoded within the memory to instruct the processor to: identify a call made via the telecommunication transceiver; analyze the call and assign the call a predicted local reputation according to the analysis, including a legitimacy confidence score; if the legitimacy confidence score is less than a first threshold, terminate the call; if the legitimacy confidence score is greater than a second threshold, cease analysis of the call; and if the legitimacy confidence score is between the first and second thresholds, continue analysis of the call.

20 Claims, 13 Drawing Sheets

(51) Int. Cl.
*G10L 15/02* (2006.01)
*G10L 15/26* (2006.01)
*G10L 25/63* (2013.01)

(52) U.S. Cl.
CPC .............. *G10L 15/26* (2013.01); *G10L 25/63* (2013.01); *H04M 2203/6027* (2013.01)

(58) Field of Classification Search
CPC ......... H04M 3/46; G06N 20/00; G10L 15/02; G10L 15/26; G10L 25/63; G10L 25/48
See application file for complete search history.

(56) References Cited

U.S. PATENT DOCUMENTS

| | | | |
|---|---|---|---|
| 9,729,727 B1* | 8/2017 | Zhang | H04M 15/56 |
| 9,774,726 B1* | 9/2017 | Jenkins | H04M 3/2281 |
| 10,110,738 B1* | 10/2018 | Sawant | G06N 3/044 |
| 10,601,986 B1* | 3/2020 | Botner | H04M 3/2281 |
| 10,657,971 B1* | 5/2020 | Newstadt | G06N 20/00 |
| 10,694,040 B1* | 6/2020 | Jiron | H04M 3/5235 |
| 10,958,779 B1* | 3/2021 | Rule | H04M 3/54 |
| 2007/0230675 A1* | 10/2007 | Marchand | H04M 15/00 379/114.14 |
| 2014/0376703 A1* | 12/2014 | Timem | H04M 3/527 379/88.02 |
| 2014/0376705 A1* | 12/2014 | Layman | H04M 3/38 379/114.14 |
| 2016/0112569 A1* | 4/2016 | Timem | H04M 3/5235 379/88.02 |
| 2016/0150413 A1* | 5/2016 | Meredith | H04W 12/06 455/410 |
| 2016/0182716 A1* | 6/2016 | Tatourian | H04M 3/42042 455/414.1 |
| 2018/0013881 A1* | 1/2018 | Cooper | H04M 3/436 |
| 2018/0082689 A1* | 3/2018 | Khoury | G10L 17/00 |
| 2019/0020759 A1* | 1/2019 | Kuang | H04W 12/00 |
| 2020/0021609 A1* | 1/2020 | Kuppanna | H04L 63/20 |
| 2020/0336597 A1* | 10/2020 | Haltom | H04M 3/42059 |
| 2020/0404094 A1* | 12/2020 | Roderick | H04M 3/42221 |
| 2021/0037135 A1* | 2/2021 | Meredith | H04M 3/4365 |
| 2021/0058507 A1* | 2/2021 | Cornwell | G06F 18/214 |
| 2021/0092228 A1* | 3/2021 | Grabowski | H04M 7/006 |
| 2021/0136200 A1* | 5/2021 | Li | G10L 17/26 |
| 2021/0141879 A1* | 5/2021 | Calahan | G06F 21/32 |
| 2021/0368043 A1* | 11/2021 | de la Garza Villarreal | H04M 7/0078 |
| 2021/0385320 A1* | 12/2021 | Nakarmi | H04M 15/00 |

* cited by examiner

FRAUDULENT CALL DETECTION

PRIORITY

This application is a continuation of U.S. patent application Ser. No. 17/384,645 filed Jul. 23, 2021, entitled "FRAUDULENT CALL DETECTION," claims priority to Indian provisional patent application 202141022415, filed May 19, 2021, which are incorporated by reference in their entirety.

FIELD OF THE SPECIFICATION

This application relates in general to personal security, and more particularly, though not exclusively, to a system and method of providing fraudulent call detection.

BACKGROUND

Users of mobile phones and other telecommunication devices may be subject to so-called "phishing" attacks, in which the phishing attacker calls and purports to be from a bank or other institution. If the user believes the phisher, he or she may disclose sensitive information to the attacker.

BRIEF DESCRIPTION OF THE DRAWINGS

The present disclosure is best understood from the following detailed description when read with the accompanying FIGURES. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion. Furthermore, the various block diagrams illustrated herein disclose only one illustrative arrangement of logical elements. Those elements may be rearranged in different configurations, and elements shown in one block may, in appropriate circumstances, be moved to a different block or configuration.

SUMMARY

Figure 1:
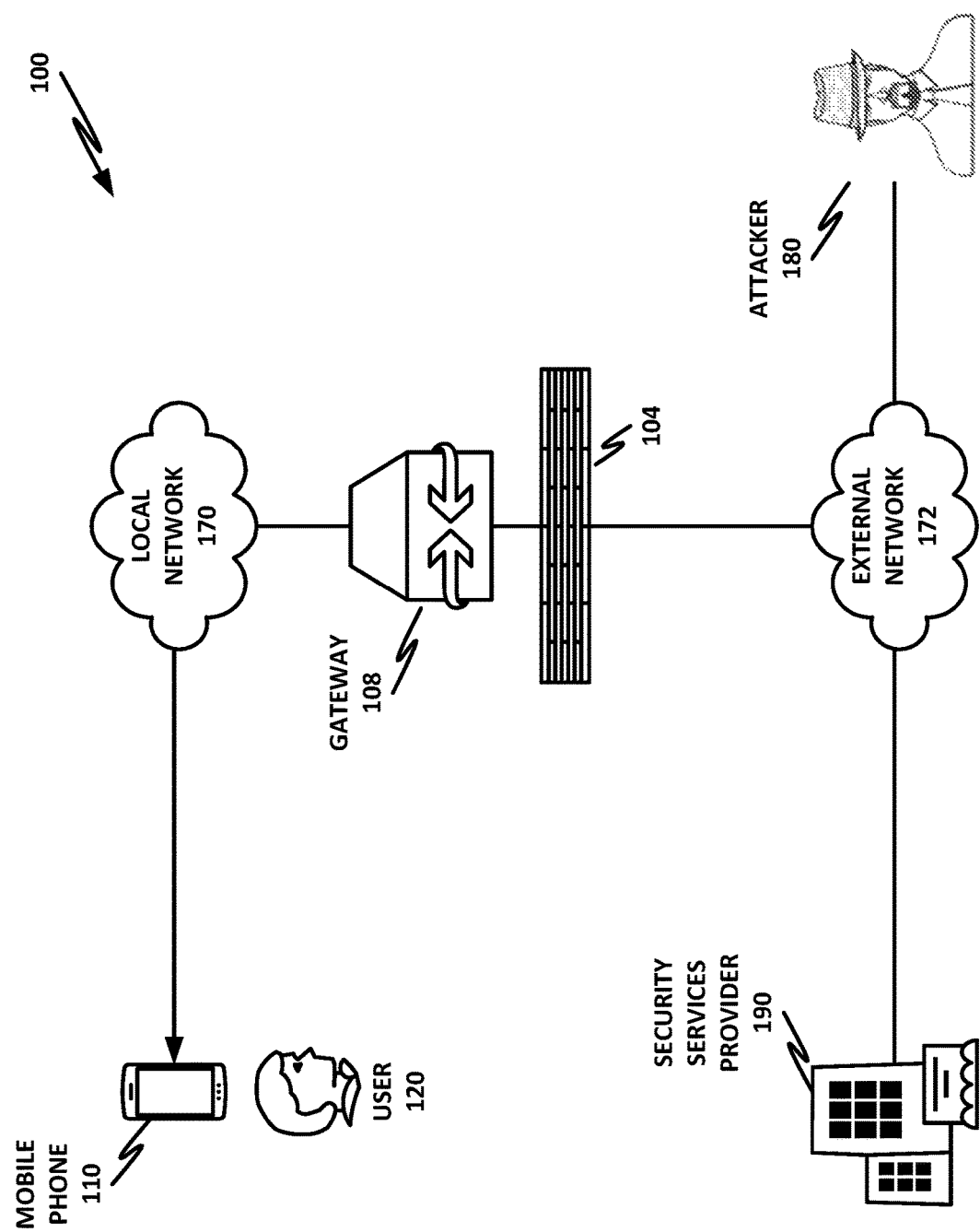
FIG. 1 is a block diagram illustrating selected elements of a security ecosystem.

In an example, there is disclosed a mobile telephone, comprising: a hardware platform comprising a processor and a memory; a telecommunication transceiver; and instructions encoded within the memory to instruct the processor to: identify a call made via the telecommunication transceiver; analyze the call and assign the call a predicted local reputation according to the analysis, including a legitimacy confidence score; if the legitimacy confidence score is less than a first threshold, terminate the call; if the legitimacy confidence score is greater than a second threshold, cease analysis of the call; and if the legitimacy confidence score is between the first and second thresholds, continue analysis of the call.

EMBODIMENTS OF THE DISCLOSURE

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

Mobile telephones and other telecommunication devices have become an important part of users' lives. In some cases, a user's mobile phone is a primary identity device, with the user being identified by phone number, and the phone itself storing credentials for websites, banks, e-commerce sites, credit cards, pay apps, and others. Furthermore, many web services require two-factor authentication. For example, web services, government agencies, banks, credit cards, and others may require a mobile telephone number for authentication, via a push message or via a text message. Thus, a mobile phone may be a "something you have" factor (in addition to a "something you know" factor) in a two-factor authentication scheme.

This enhances user convenience, and also has helped to enhance security. For example, it is no longer common for a user to physically visit a bank to perform ordinary transactions, to check accounts, or to do many other tasks. Rather, many banking transactions are done via phone call, or via the internet through a banking portal or a banking app. Similarly, e-commerce has changed the modes in which people shop for and buy products. This increases the convenience of shopping, and saves time and cost for users. People can also access services facilitating food and grocery ordering, booking of flights, train tickets, or other travel accommodations, concert ticket purchases, interpersonal communications, and many other activities. These activities are commonly performed via a mobile phone app or a phone call. Users may pay for services via options like credit card, debit card, internet money transfer, payment app, or interactive voice response (IVR) via telephone line or mobile phone. In addition to the convenience and security of mobile phone usage, there are also complications. For example, a user's phone has become a single point of failure for many
} activities. If the user's phone and/or phone number are compromised, then a scammer may be able to cause great harm to the user. For example, if it is not feasible to "brute force" or otherwise compromise a user's security via electronic means, then so-called "phishing" or other social engineering style attacks can be used to induce a user to volunteer information. For example, a scammer could use an advertisement for a massive discount, or fraudulently call innocent people posing as a financial institution, and induce them to share details like a debit or credit card number, passwords, personal identification numbers (PINs), or other sensitive information.

Such fraudulent activity has become a serious problem, and users lose large amounts of money every year to such social engineering style attacks. For example, in India, users access the internet primarily through mobile phones, and many of the less sophisticated users lack cybersecurity knowledge. This has led to fraud rings and scams on small and large scales, including financial frauds in which people have lost significant sums of money. A common phishing attack is for a scammer to call a user and claim to be from the user's bank, and then perform a fake authentication to make the user believe that the scammer is calling from a bank or a legitimate financial institution. If the user believes that the call is genuine, then they may volunteer this type of information.

It is therefore beneficial for users to have a trusted way of verifying a caller, and of inferring the caller's intent. This could be performed, for example, by analyzing the context of an active call, and also acquiring a reputation for the phone number. Such verification can occur in the first instance by checking the incoming phone number before the user answers it, and indicating to the user whether the call may be fraudulent. A call can also be analyzed contextually while it is in progress. In cases where the mobile phone itself can perform this analysis, the onus is removed from the end user to verify every phone call. This helps to prevent the end user from falling prey to fraudulent calls.

Notably, users can get scammed not only from incoming calls, but also in some cases on outgoing calls. For example, a user may search the internet to get the phone number of a bank, tech support, or other enterprise of interest. The contact numbers may be legitimate if the user picks them up from a trusted or genuine website, such as the company's own website. But there are many cases where numbers may be posted on a blog or fraudulent website. For example, a fraudulent website could imitate a legitimate website, including duplicating many of the visual elements and the look and feel of the website. The fraudulent website may then provide a false customer service phone number that actually directs to the scammer. An unwary user can then fall into the trap of this scam and actually be the victim of phishing on an outgoing call, and may still lose credentials, resulting in financial and personal loss.

For example, a relatively recent case in India included a user coming across a fake customer care number for the food delivery service Zomato via Google search. A Bengaluru woman lost all the money from her savings account after she contacted the number, thinking it was Zomato customer care. The woman was unhappy with her order, and was seeking a refund. The false customer care agent reassured the customer that her case would be handled, and that she would get a full refund within 24 hours. Minutes later, her bank account had a $0 balance.

Illustrative and nonlimiting examples of fraudulent calls include the following:

1. Fraudulent bank calls. A caller attempts to gather information from the victim for authorization purposes, and may then give reasons such as the automated teller machine (ATM) PIN supposedly expiring soon, or claim that the user has won the lottery and received a check that will soon expire. Other pretenses could be that the user has not maintained a minimum balance, or that a credit or debit card will soon expire.
2. Fraudulent calls claiming to be a telecom vendor. In this case, the caller claims to be from a telecom vendor, greets the victim by name, and asks whether the victim's number is prepaid or postpaid. After verifying the victim's details such as date of birth, name, location, and similar, the caller tries to help the victim get a better calling or internet plan, or enter the caller in some lucky draw offer. Finally, the caller asks for bank details.
3. Fraudulent mobile web app calls. These can involve pay services such as PayPal, Venmo, Apple Pay, Paytm, BHIM, and others. For example, soon after a demonetization drive took place in India, scammers began making calls to the elderly to "assist" them in getting an account with BHIM, Paytm, or some other mobile wallet app. The callers claimed to assist the users with mobile banking, and purported to deposit free money to the wallet as a sign-up bonus. However, the purpose of these calls was actually to gather confidential banking information and to steal money from the user's accounts or wallets.
4. Fraudulent income tax calls. In this scam, the caller claims to be an income tax officer. The caller may claim that the user misfiled taxes, or is entitled to an unexpected tax refund. Unaware that it is a fraudulent call, the victim may respond to queries, including confidential information that can be used to compromise the user socially or financially.
5. Fraudulent technical support scams. In this scam, a scammer calls the target and claims to be from tech support, for example from Microsoft. The scammer then tricks the user into allowing the scammer to make a remote connection to the user's computer. The scammer then has access to the user's files, personal data, bank account information, stored passwords, and other data.

To mitigate these types of scams, a mobile phone may include a local security agent that interoperates with a cloud-based security service. The security agent may analyze the dynamic context of an active call to detect fraud, and alert the user right at the source (e.g., on the phone).

An illustrative example of a security agent of the present specification includes a machine learning (ML)-based active call fraud detection engine. This engine may gather and analyze multiple call context details, like the location of the caller, voice frequency of the caller, whether the number is a known fraud number, what apps are open on the phone, whether a short message service (SMS) message was received during the call, the time of day, the words used on the call (e.g., using a speech-to-text converter passed through an ML-based engine to classify the context), and other indicators of whether the call is fraudulent or legitimate. In an illustrative example, the security agent may be built into the mobile operating system, and may be, for example, part of the phone dialer.

The security agent may analyze both incoming and outgoing calls dialed by the user. In particular, the system may determine whether the number is from or to a number that is not present in the user's phone book. If the number is not present in the phone book, the system may provide an option for the user to proceed with the call in "safe mode." The security agent may then proceed with analysis if the call is in safe mode. Advantageously, this can eliminate further analysis for calls to and from well-known numbers.

Alternatively, even a number that is in the user's phone book may not necessarily be trusted. This is particularly true if it is the first time that the user has made a call to, or received a call from, the phone number. For example, if the user performs a web search for "Bank of India customer support," and then adds that number to the phone book, that number could be malicious even though it appears in the user's phone book. Thus, the security agent may analyze a call the first time the call is placed to or received from a particular number, even if the number is in the phone book.

If the call is in safe mode (e.g., under analysis), the system may start by recording the call for a few seconds. The time that is recorded is configurable, but is defaulted to 10 seconds. The system may then convert the speech in the call to text using a speech-to-text converter. In parallel, the system may start to gather various other contexts of the call, like running applications, receipt of an SMS message during the call, location of the user, and others.

The transcribed text samples, along with context identified during the call, may be sent to an on-device ML model, which is part of a fraud detection engine. The model itself may be built in the cloud, and then synchronized with the client periodically. This ensures that the client maintains an up-to-date fraud call detection engine, and also offloads the resource intensive task of building an ML model to a cloud service where more resources may be available. Furthermore, the cloud service may have access to a much larger training data set than an individual user would have access to. In some cases, to preserve user privacy, the training data may be anonymized to ensure that user privacy is not compromised.

If the local call detection engine can classify the call as fraudulent with a high confidence using the context and the collected voice-to-text samples, the call may be immediately terminated, and the user alerted. In an illustrative example, a threshold confidence for determining that a call is fraudulent is greater than 80%. In other examples, the threshold may be another value, such as 60%, 70%, 80%, 90%, 95%, or any value above 50%.

Furthermore, contextual information may be sent to a cloud-based fraud detection engine. This system can ensure that private information in the context is automatically filtered to remove any personally identifying information (PII) before sending it to the cloud engine. These data can be used to further enhance the ML model, and may help in preparing a report, if the caller or callee complains of the classification.

If the local detection engine cannot classify the call as fraudulent above the confidence level, using the context and the gathered voice-to-text samples, the system may continue to record the call for an additional time period. The system can then continue to convert the speech on the call to text, and send the speech to the cloud engine for additional analysis. The cloud engine can then respond with its own classification and confidence level. If the cloud engine classifies the call as benign, the sample collection may be stopped, and the call continues as though not in safe mode. Otherwise, the local detection engine may continue to collect samples, and may either send the samples to the cloud for further action, or analyze them locally. The context in samples sent from the device may again run through a filter process to ensure that any sensitive or PII data are not sent to the cloud. Over a time period, the cloud engine using the context sent from various end devices may enhance the ML model for more accurate and confident classification.

In some embodiments, the system can add support for new languages by downloading models for those additional languages. When the client dialer application is installed for the first time, the system can be preconfigured to work with a few selected languages, with one of them set as the default.

The security agent disclosed herein provides information to receive real-time data about a call, and to act on a call even while it is still active. This provides a system in which various context data are gathered while the call is active, and the data are used to determine whether the call is fraudulent. This may include text or keywords generated from the speech-to-text process. The system also provides a cloud-based fraud detection engine to send the call context from users to build an ML model to learn about and detect fraudulent calls. The system also provides a technique for using a local or on-device fraud detection model to optimize the user experience, instead of needing to interact with the cloud engine every time. Furthermore, the system may help to ensure that data sent to the cloud for additional analysis and identification of fraudulent calls are filtered to protect user privacy. The user's privacy and security are enhanced by providing the user an option to dial or answer any call in the "secure call mode," in which the security engine is active and analyzes the call. This approach integrates the active call fraud detection engine into the operating system (OS) dialer itself to enhance the user experience. The technique may also identify a call category (e.g., credit card PIN exchange, marketing call, insurance company call, call to a friend, etc.). It may do this by analyzing text generated from the speech-to-text converter. In addition, the system also provides a framework in the client for dynamic addition of new language support for fraudulent call detection.

Notably, there exist multiple applications that tell whether a calling phone number is fraudulent, but this may occur strictly based on crowdsourced information. Furthermore, many of these applications gather the user's confidential information, which could pose a further security risk to the user. Embodiments of the present specification ensure user privacy by anonymizing data, and do not rely solely on crowdsourced information, although crowdsourced information may be an input to the engine. In embodiments, crowdsourced information is just one of several parameters that may be used, along with context information collected on the device during an active call. These data may be provided to an ML engine for classification.

This system provides a real-time ability to analyze a voice of the caller to detect whether the call is a scammer, and may provide a decision within several seconds, which gives the user an opportunity to decide what to do, and to act as appropriate.

In embodiments, any call placed in the so-called "secure mode" will be analyzed by the security engine. This may include capturing voice samples for a few seconds, and then converting the samples to text, along with capturing additional context parameters gathered during the call. These are provided to the local ML model on the client for initial classification. The confidence level of this initial classification may be used to decide if the active call is fraudulent, or if additional voice or text samples in context information need to be collected and sent to the cloud service for further analysis. This can improve detection on the local device, and also build a better fraud detection ML model in the cloud.

When a user receives a call from or places a call to an unknown source, the user may choose to make the call in "safe mode." As the conversation continues, the call content may be recorded, and the speech may be converted to text. Additional contextual parameters may be collected on the device, and the information may be passed to a local fraud call detection engine, which hosts its own ML model. If the contents of a call are identified as suspicious above a threshold, the call is automatically terminated and the user is notified.

The foregoing can be used to build or embody several example implementations, according to the teachings of the present specification. Some example implementations are included here as nonlimiting illustrations of these teachings.

There is disclosed an example of a computer-implemented method, comprising: while a voice call is in progress, performing local analysis, comprising analyzing audio of the voice call on local hardware of a phone to identify indicia of deceit, and assigning the voice call a local reputation with a confidence; based on the confidence, supplementing local analysis with cloud-based analysis of call attributes; and after determining, based on the local analysis and cloud-based analysis, that the call is malicious, terminating the call while the call is in progress.

There is further disclosed an example, in connection with any foregoing example, wherein performing the local analysis comprises operating a pre-trained machine learning (ML) model.

There is further disclosed an example, in connection with any foregoing example, wherein performing local analysis comprises analyzing voice frequency of a caller.

There is further disclosed an example, in connection with any foregoing example, wherein performing local analysis comprises analyzing words spoken during the call.

There is further disclosed an example, in connection with any foregoing example, wherein performing the local analysis further comprises analyzing contextual data of the voice call.

There is further disclosed an example, in connection with any foregoing example, wherein the contextual data comprise caller location.

There is further disclosed an example, in connection with any foregoing example, wherein the contextual data comprise a telephone number that originated the call.

There is further disclosed an example, in connection with any foregoing example, wherein the contextual data comprise apps operating on the phone concurrently with the call.

There is further disclosed an example, in connection with any foregoing example, wherein the contextual data comprise receipt of a text message on the phone during the call.

There is further disclosed an example, in connection with any foregoing example, wherein the contextual data comprise time of day.

There is further disclosed an example, in connection with any foregoing example, wherein the call is an incoming call.

There is further disclosed an example, in connection with any foregoing example, wherein the call is an outgoing call.

There is further disclosed an example, in connection with any foregoing example, of an apparatus comprising means for performing the method.

There is further disclosed an example, in connection with any foregoing example, wherein the means for performing the method comprise a processor and a memory.

There is further disclosed an example, in connection with any foregoing example, wherein the memory comprises machine-readable instructions that, when executed, cause the apparatus to perform the method.

There is further disclosed an example, in connection with any foregoing example, wherein the apparatus is a computing system.

There is further disclosed an example, in connection with any foregoing example of at least one computer readable medium comprising instructions that, when executed, implement a method or realize an apparatus.

There is further disclosed an example, in connection with any foregoing example, of one or more tangible, nontransitory computer-readable storage media having stored thereon executable instructions to: while a voice call is in progress, perform local analysis, comprising analyzing audio of the voice call on local hardware of a phone to identify indicia of deceit, and assigning the voice call a local reputation with a confidence; based on the confidence, supplement local analysis with cloud-based analysis of call attributes; and after determining, based on the local analysis and cloud-based analysis, that the call is malicious, terminate the call while the call is in progress.

There is further disclosed an example, in connection with any foregoing example, wherein performing the local analysis comprises operating a pre-trained machine learning (ML) model.

There is further disclosed an example, in connection with any foregoing example, wherein performing local analysis comprises analyzing voice frequency of a caller.

There is further disclosed an example, in connection with any foregoing example, wherein performing local analysis comprises analyzing words spoken during the call.

There is further disclosed an example, in connection with any foregoing example, wherein performing the local analysis further comprises analyzing contextual data of the voice call.

There is further disclosed an example, in connection with any foregoing example, wherein the contextual data comprise caller location.

There is further disclosed an example, in connection with any foregoing example, wherein the contextual data comprise a telephone number that originated the call.

There is further disclosed an example, in connection with any foregoing example, wherein the contextual data comprise apps operating on the phone concurrently with the call.

There is further disclosed an example, in connection with any foregoing example, wherein the contextual data comprise receipt of a text message on the phone during the call.

There is further disclosed an example, in connection with any foregoing example, wherein the contextual data comprise time of day.

There is further disclosed an example, in connection with any foregoing example, wherein the call is an incoming call.

There is further disclosed an example, in connection with any foregoing example, wherein the call is an outgoing call.

There is further disclosed an example, in connection with any foregoing example, of an apparatus comprising means for executing the instructions.

There is further disclosed an example, in connection with any foregoing example, wherein the means comprise a processor circuit and a memory.

There is further disclosed an example, in connection with any foregoing example, wherein the apparatus is a computing system.

There is further disclosed an example, in connection with any foregoing example, wherein the apparatus is a mobile telephone.

There is further disclosed an example, in connection with any foregoing example, of a computing apparatus, comprising: a processor circuit and a memory; and instructions encoded within the memory to instruct the processor circuit to: while a voice call is in progress, perform local analysis, comprising analyzing audio of the voice call on local hardware of a phone to identify indicia of deceit, and assigning the voice call a local reputation with a confidence; based on the confidence, supplement local analysis with cloud-based analysis of call attributes; and after determining, based on the local analysis and cloud-based analysis, that the call is malicious, terminate the call while the call is in progress.

There is further disclosed an example, in connection with any foregoing example, wherein performing the local analysis comprises operating a pre-trained machine learning (ML) model.

There is further disclosed an example, in connection with any foregoing example, wherein performing local analysis comprises analyzing voice frequency of a caller.

There is further disclosed an example, in connection with any foregoing example, wherein performing local analysis comprises analyzing words spoken during the call.

There is further disclosed an example, in connection with any foregoing example, wherein performing the local analysis further comprises analyzing contextual data of the voice call.

There is further disclosed an example, in connection with any foregoing example, wherein the contextual data comprise caller location.

There is further disclosed an example, in connection with any foregoing example, wherein the contextual data comprise a telephone number that originated the call.

There is further disclosed an example, in connection with any foregoing example, wherein the contextual data comprise apps operating on the phone concurrently with the call.

There is further disclosed an example, in connection with any foregoing example, wherein the contextual data comprise receipt of a text message on the phone during the call.

There is further disclosed an example, in connection with any foregoing example, wherein the contextual data comprise time of day.

There is further disclosed an example, in connection with any foregoing example, wherein the call is an incoming call.

There is further disclosed an example, in connection with any foregoing example, wherein the call is an outgoing call.

There is further disclosed an example, in connection with any foregoing example, wherein the computing apparatus is a mobile telephone.

A system and method for providing fraudulent call detection will now be described with more particular reference to the attached FIGURES. It should be noted that throughout the FIGURES, certain reference numerals may be repeated to indicate that a particular device or block is referenced multiple times across several FIGURES. In other cases, similar elements may be given new numbers in different FIGURES. Neither of these practices is intended to require a particular relationship between the various embodiments disclosed. In certain examples, a genus or class of elements may be referred to by a reference numeral ("widget 10"), while individual species or examples of the element may be referred to by a hyphenated numeral ("first specific widget 10-1" and "second specific widget 10-2").

FIG. 1 is a block diagram of a security ecosystem 100. In the example of FIG. 1, security ecosystem 100 may be an enterprise, a government entity, a data center, a telecommunications provider, a "smart home" with computers, smart phones, and various internet of things (IoT) devices, or an individual user. Security ecosystem 100 is provided herein as an illustrative and nonlimiting example of a system that may employ, and benefit from, the teachings of the present specification.

Within security ecosystem 100, one or more users 120 operate devices, such as mobile phone 110. Mobile phone 110 is provided herein as an illustrative example, and any other device, such as a telecommunication device, may be used.

Mobile phone 110 may be communicatively coupled to a local network 170, for example via a WiFi or equivalent local connection. Local network 170 may be any suitable network or combination of one or more networks operating on one or more suitable networking protocols, including a local area network, a home network, an intranet, a virtual network, a wide area network, a wireless network, a cellular network, or the internet (optionally accessed via a proxy, virtual machine, or other similar security mechanism) by way of nonlimiting example. Local network 170 may also include one or more servers, firewalls, routers, switches, security appliances, antivirus servers, or other network devices, which may be single-purpose appliances, virtual machines, containers, or functions. Some functions may be provided on client devices 110.

In this illustration, local network 170 is shown as a single network for simplicity, but in some embodiments, local network 170 may include any number of networks, such as one or more intranets connected to the internet. Local network 170 may also provide access to an external network, such as the internet, via external network 172. External network 172 may similarly be any suitable type of network.

Local network 170 may connect to the internet via gateway 108, which may be responsible, among other things, for providing a logical boundary between local network 170 and external network 172. Local network 170 may also provide services such as dynamic host configuration protocol (DHCP), gateway services, router services, and switching services, and may act as a security portal across local boundary 104.

In some embodiments, gateway 108 could be a simple all-in-one home router, or could be a sophisticated enterprise infrastructure including routers, gateways, firewalls, security services, deep packet inspection, web servers, or other services.

In further embodiments, gateway 108 may be a standalone internet appliance. Such embodiments are popular in cases in which ecosystem 100 includes a home or small business. In other cases, gateway 108 may run as a virtual machine or in another virtualized manner. In larger enterprises that features service function chaining (SFC) or NFV, gateway 108 may be include one or more service functions, containers, microservices, and/or virtualized network functions.

Local network 170 may communicate across local boundary 104 with external network 172. Local boundary 104 may represent a physical, logical, or other boundary. External network 172 may include, for example, websites, servers, network protocols, and other network-based services. In one example, an attacker 180 (or other similar malicious or negligent actor) also connects to external network 172. A security services provider 190 may provide services to local network 170, such as security software, security updates, network appliances, or similar. For example, MCAFEE, LLC provides a comprehensive suite of security services that may be used to protect user 120 and his devices.

Attacker 180 may be, for example, a phishing attacker whose goal is to trick user 120 into disclosing personal information via mobile phone 110. For example, attacker 180 may directly call user 120 and claim to be a representative of the user's bank, credit card company, a legitimate e-commerce website, or other enterprise. Approaches other than direct calling are also used, such as posting a look-alike website that visually mimics a legitimate enterprise, and that gives a phone number that directs to attacker 180 instead of the true enterprise. Once attacker 180 has user 120 on a phone call, a web chat, or other contact, attacker 180 solicits personal information rom user 120, such as account numbers, credit card numbers, social security numbers, answers to security questions, or other information that can be used to steal user 120's identity, steal money from accounts, or otherwise cause mischief at the user's expense.

In an illustrative example, user 120 may contract with or subscribe to a security services provider 190, which may provide security services, updates, antivirus definitions, patches, products, and services. MCAFEE, LLC is a non-limiting example of such a security services provider that offers comprehensive security and antivirus solutions. In some cases, security services provider 190 may include a threat intelligence capability such as McAfee's global threat intelligence (GTI™) database, which provides global reputation data. User 120 may deploy software from security services provider 190 on mobile phone 110 and/or other devices within the protected network, including a call protection service as illustrated herein. Software running on mobile phone 110 may be supplemented with cloud services provided by security services provider 190.

Figure 2:
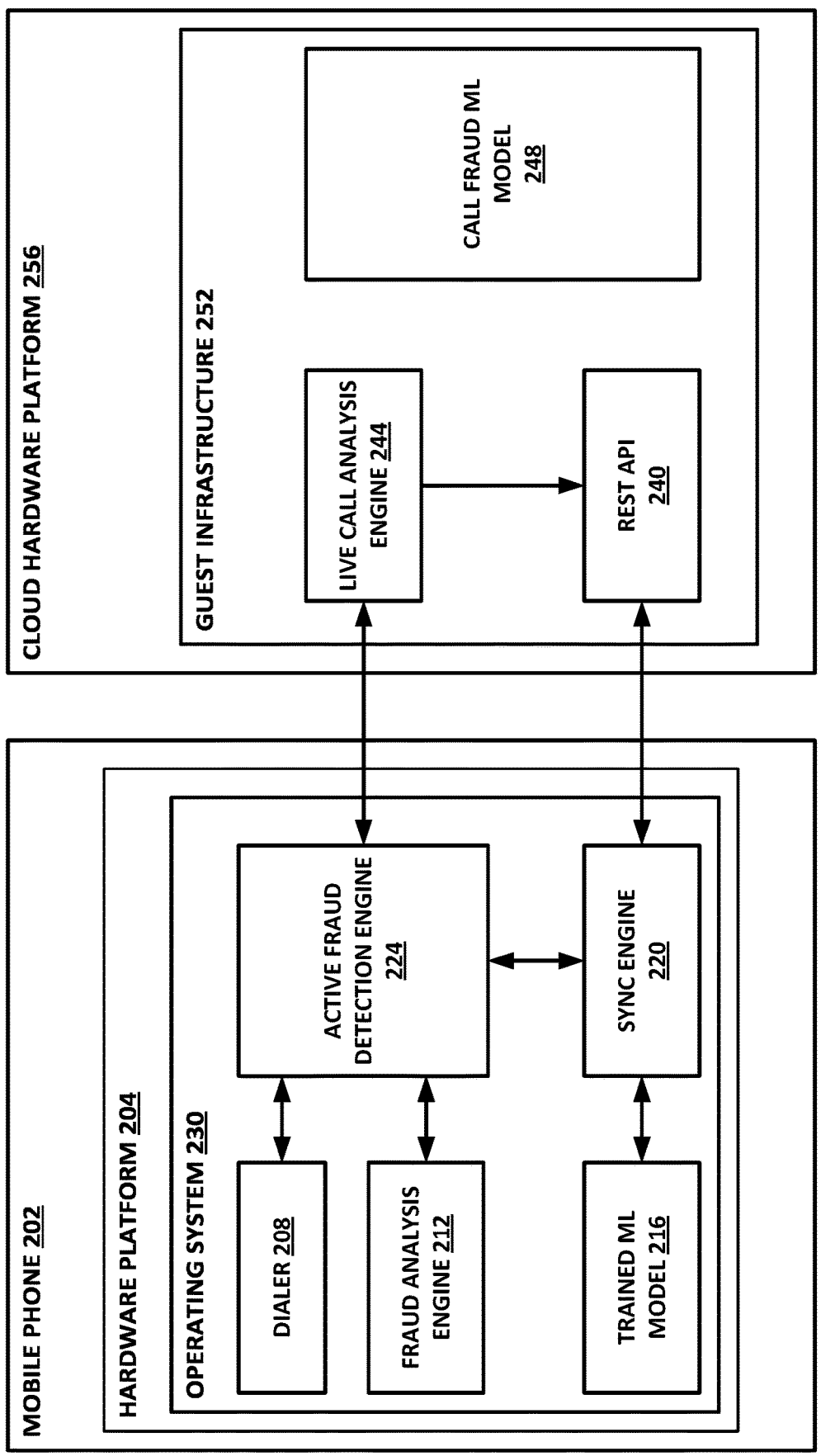
FIG. 2 is a block diagram illustrating selected components of a fraudulent call detection ecosystem.

FIG. 2 is a block diagram illustrating selected components of a fraudulent call detection ecosystem, including a mobile phone 202 and a cloud platform 256.

Figure 9:
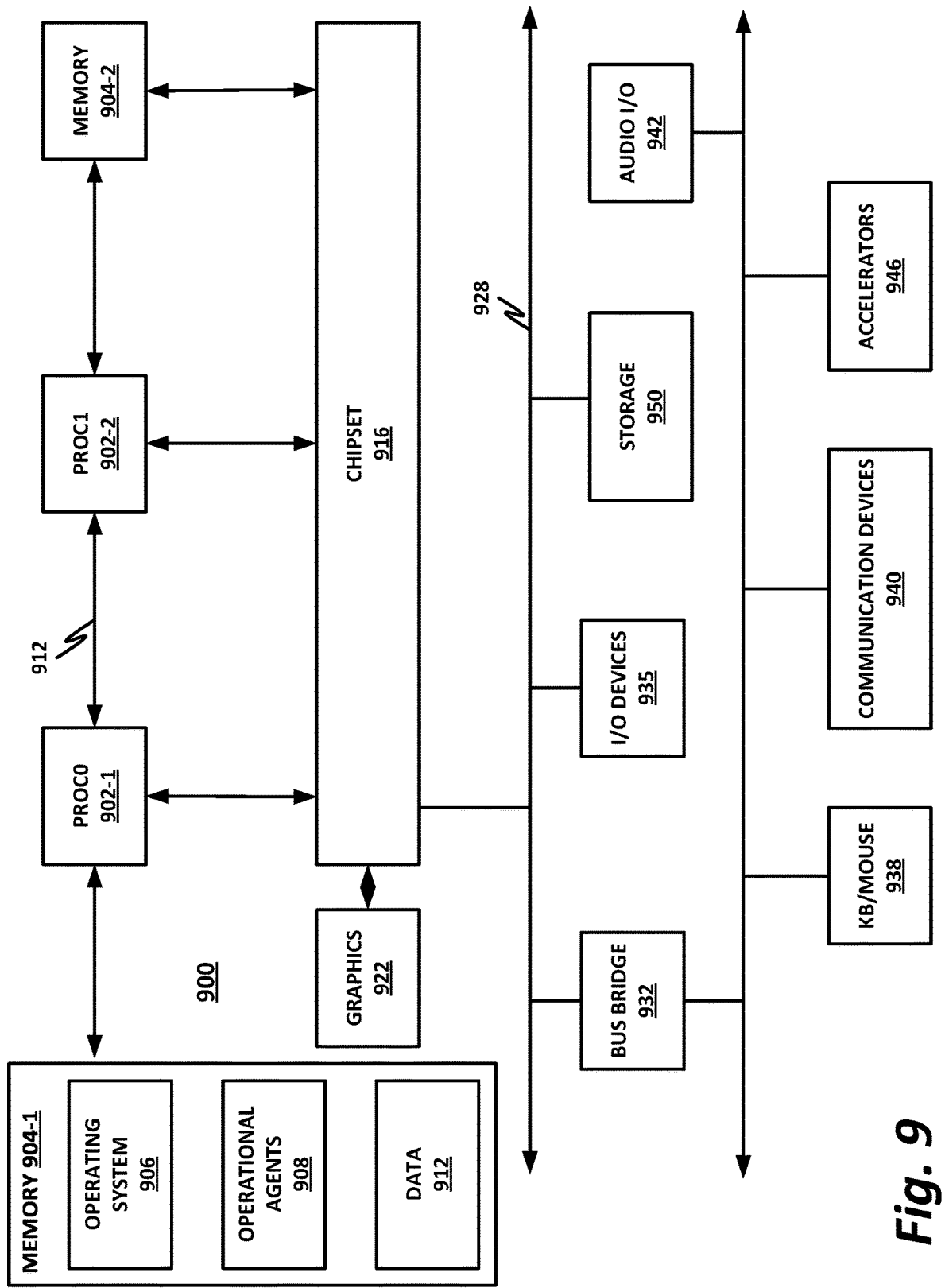
FIG. 9 is a block diagram illustrating selected elements of a hardware platform.
Figure 10:
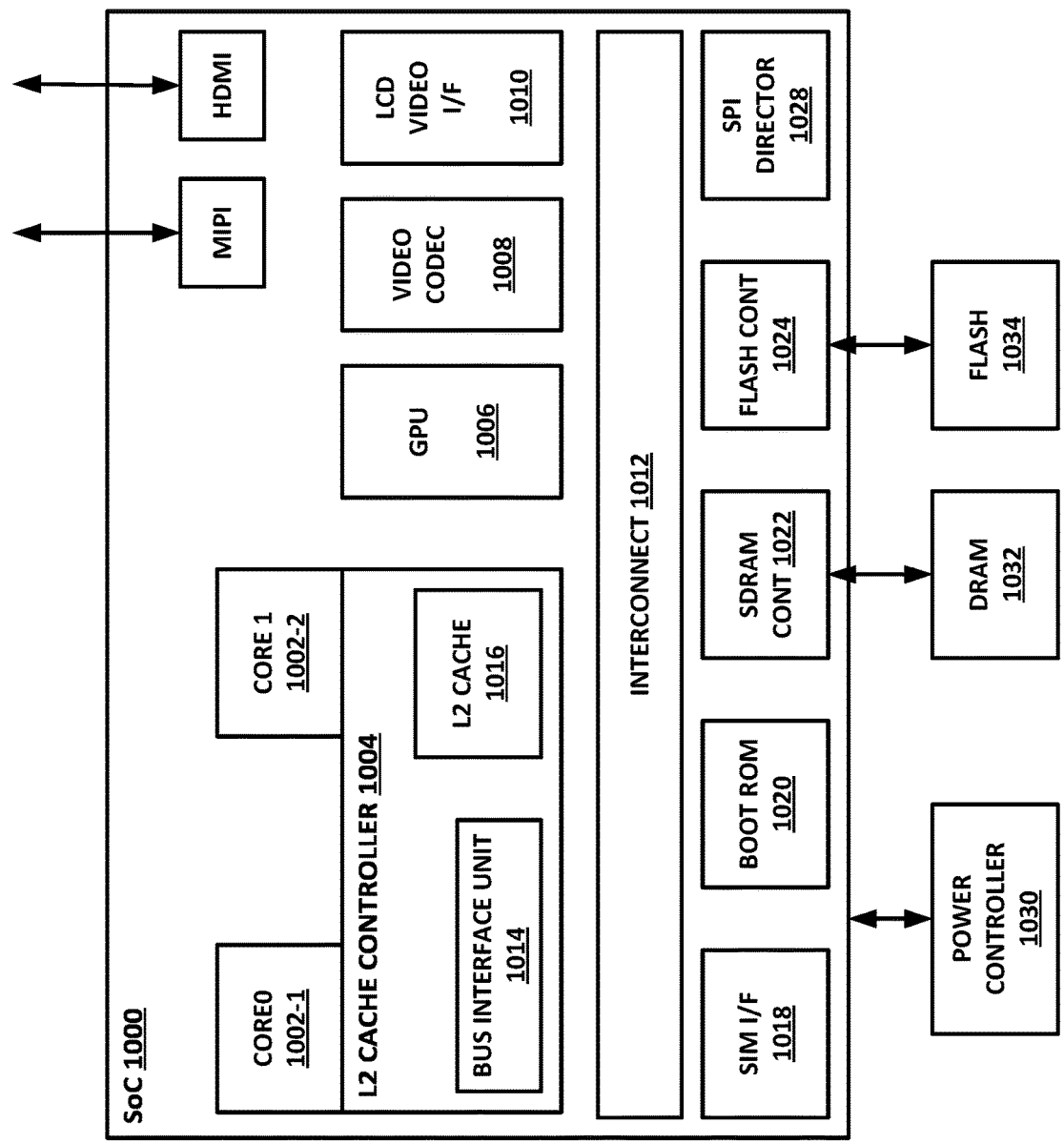
FIG. 10 is a block diagram illustrating selected elements of a system-on-a-chip (SoC).

Mobile phone 202 includes a hardware platform 204 which may include, for example, a processor, a memory, a transceiver that may be used to place and receive voice calls, and other selected components. Additional examples of a hardware platform are illustrated in FIGS. 9 and 10, below.

Hardware platform 204 hosts an operating system 230. Operating system 230 may provide the basic software services and drivers to provide software. Running within operating system 230 are various software engines, including a dialer 208, fraud analysis engine 212, trained ML model 216, active fraud detection engine 224, and a sync engine 220.

Dialer 208 may be a dialer that is provided in the traditional phone call stack, and may be a product provided by a security services vendor, such as security services vendor 190 of FIG. 1. This application provides a user interface to dial or answer a call, and includes the option to dial or answer a call in a "safe mode" or other protected mode, or any other mode in which fraud protection is active. In some cases, dialer 208 provides a plurality of modes, including a safe or protected mode, as well as an unrestricted mode in which protection services are not provided for the phone call. Dialer 208 may include instructions or other logic that perform a gatekeeper function, such as by determining whether a call should be placed in a protected or safe mode. For example, if the number is in the user's address book, then safe mode may be unnecessary.

However, in some cases, even having the phone number in the user's address book may not be sufficient. For example, if the phone number is in the user's address book, it could be because the user found the number online and entered it in the address book so that it would not be forgotten. Thus, even if the number is in the user's address book or contact list, the first time a call is placed to the number, the device may be placed in safe mode to scan the call to determine whether fraudulent activity is likely.

In some cases, a user interface may provide an option to designate certain phone numbers as known or safe, in which case safe mode is not active for those phone numbers. Advantageously, the majority of calls that a user places or receives may be to or from common contacts that may be known to be safe. For example, spouses, other family members, doctors, pharmacies, schools, workplaces, and others may be commonly made phone calls, and may be assumed to be safe. Thus, there is no need to expend the resources to always monitor these phone numbers.

In cases where the phone call is made in safe or protected mode, and protection services are necessary, other elements may be active. For example, active fraud detection engine 224 may activate if the call is to be placed in safe mode. When active fraud detection engine 224 is active, it uses a fraud analysis engine 212 to analyze the call. This could include, for example, taking audio samples of the call, analyzing metadata about the call, querying a cloud service for a reputation for the phone number, or taking other action.

A sync engine 220 may access a representational state transfer (REST) API on cloud service 256, to synchronize a trained ML model 216 that is local to mobile phone 202. Trained ML model 216 may perform voice analysis, stress analysis on the voice, keyword searches, or other ML algorithms to determine whether a call is likely fraudulent. Trained ML model 216 may interoperate with fraud analysis engine 212 to determine whether the call is legitimate or fraudulent. For example, active fraud detection engine 224 may use fraud analysis engine 212 and trained ML model 216 to collect inputs, and to assign an overall local predicted reputation to a phone call. This local predicted reputation may include, for example, a reputation score or probability. This score or probability may indicate a probability that the call is legitimate.

Decisions may be made depending on this probability. For example, if there is a greater than 80% likelihood that the call is legitimate, then the call may be permitted to proceed without further analysis. On the other hand, if there is a less than 20% chance that the call is legitimate (i.e., an 80% chance that it is fraudulent), then the call may be dropped or terminated immediately. Between this 20% and 80% confidence level is an approximately 60% range, wherein the reputation of the call has not been established with sufficient confidence. In the case where there is an insufficient confidence score to either convict or pass the call, then additional analysis may be provided, including querying cloud platform 256 for additional analysis.

Cloud hardware platform 256 may provide a hardware platform, including a processor and/or memory, as well as a guest infrastructure 252, such as a virtualization or a containerization infrastructure. Guest infrastructure 252 may include a live call analysis engine 244, which may be used to perform real-time analysis on ongoing calls. For example, when active fraud detection engine 224 of operating system 230 determines that the confidence score for a call is not sufficient to either convict or pass the call, active fraud detection engine 224 may query live call analysis engine 244. Active fraud detection engine 224 may provide to live call analysis engine 244 additional information, such as call metadata, one or more voice samples, and other information about the call. Live call analysis engine 224 may then perform additional analysis on the call to determine whether the call is fraudulent or legitimate. Live call analysis engine 244 may also provide data to operating system 230 via REST API 240, which interacts with sync engine 220.

Guest infrastructure 252 may also maintain a call fraud ML model 248. This may include a large number of inputs, and may be used to calculate appropriate parameters for training an ML model. The data for training call fraud ML model 248 may be collected from a number of devices and subscribers, and thus may provide a large database of calls. Once a model is sufficiently trained, guest infrastructure 252 may push the model out via REST API 240 to sync engine 220, which can then store the latest model as trained ML model 216.

Figure 3:
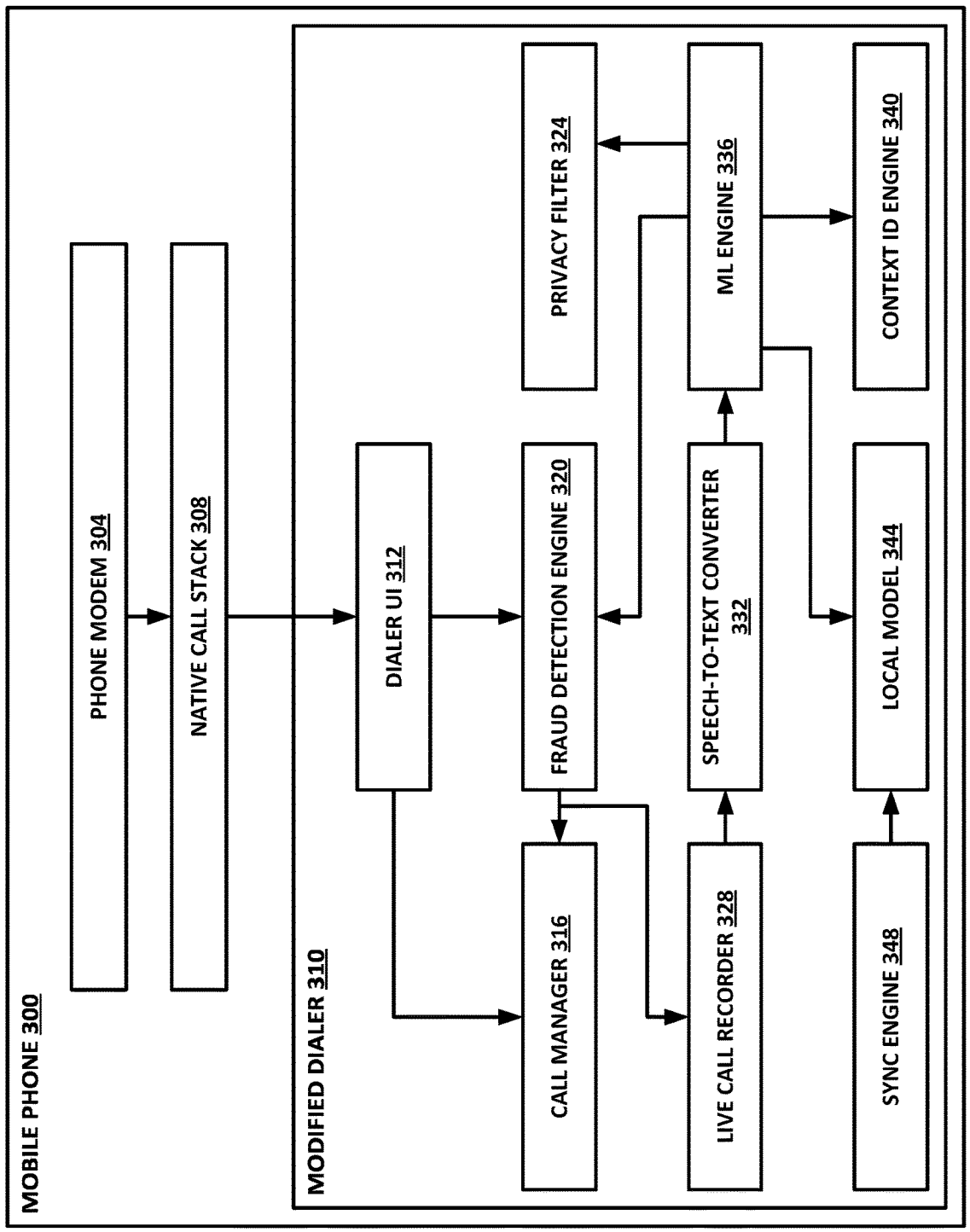
FIG. 3 is a block diagram illustrating selected elements of a mobile phone.

FIG. 3 is a block diagram illustrating selected elements of a mobile phone 300. FIG. 3 illustrates additional details of a modified dialer 310, which may be an embodiment of dialer 208 of FIG. 2, or another dialer.

In this example, mobile phone 300 includes a phone modem 304, which may be a transceiver that allows the user to place and receive voice calls.

Native call stack 308 provides the logic and circuitry to natively place and receive phone calls. Native call stack 308 may include its own phone dialer. However, this may be replaced by modified dialer 310. Modified dialer 310 includes various components, such as dialer user interface (UI) 312, call manager 316, fraud detection manager 320, privacy context filter 324, live call recorder 328, speech-to-text converter 332, ML engine 336, context identification (ID) engine 340, local model 340, and sync engine 348.

Each of these may be, for example, a software block, or a combination of software, hardware, and/or firmware, as appropriate.

UI 312 may facilitate the end user dialing or receiving an incoming call in safe mode. For example, UI 312 may query the user for whether to operate in safe mode when a call comes in or is placed, and this option may be available to the user via, for example, a UI button any time a call is made or received, regardless of whether the phone number is known or not. This could also provide an option for the user to set the default for a particular phone number, either to operate in safe mode or in unrestricted mode, or could provide other options. UI 312 may also provide an interface to download, configure, and access other options such as a default language to be used, and whether active call fraud detection is the default, or if it is to be used only for selected calls.

Live call recorder 328 may have access to the device microphone, and to the storage, and may record portions of a phone call, such as in 10-second to 20-second snippets, which can then be further analyzed. Speech-to-text converter 332 may be used to convert the recorded audio to text for further analysis.

Active call context collection engine 340 may collect various contextual parameters while the call is in progress. This could include, by way of illustrative and nonlimiting example, applications running, SMS monitoring, location monitoring, or similar contextual data.

Call manager 316 may provide call category identification. For example, this engine may take contextual information, such as text extracted from speech, and extract keywords based on the language configured. It may then identify the call category or type. For example, it may identify the call as a banking call, a marketing call for a product, an insurance call, a credit card PIN change, a call to a friend, or similar. The system may internally use a store of words or bag-of-words technique to classify the call into one of these categories.

Fraud detection engine 320 may take the call category information, contextual information, and voice samples to classify the call as fraudulent for the call category. ML engine 336 uses local model 344 to provide an ML algorithm, which may provide an appropriate classification model. If the confidence level is not satisfactory, fraud detection engine 320 may interact with a cloud service to pass call data such as call context, call category, and/or voice samples for analysis and model building on the cloud.

Sync engine 348 may be used to synchronize data between local model 344 and the cloud. Fraud detection engine 320 may also use sync engine 348 to send data back and forth between the cloud.

Privacy filter 324 may be used to ensure that the context, samples sent to the cloud, and other data are filtered for any PII information of the user. This can include, for example, credit card number, PIN, name, bank account number, or similar. It may mask this information before sending the data to the cloud. This ensures that the end user will not be profiled with the context information sent to the cloud.

In general terms, modified dialer 310 may provide a two-phase call monitoring system.

The first phase may be a call connection phase. Depending on whether the call is an incoming call an outgoing call, several rules may be applied to screen the phone number. If the phone number is a known spam or fraudulent phone number, the call may be automatically disconnected, and the user immediately alerted. This may include querying a cloud service as the call comes in, to determine a reputation for the phone number. The known spam number may be additional information that is synced between the endpoint and the cloud service on a periodic basis. Alternatively, a query may be made at the time that the call is received. If the number is new and cannot be found in the spam list, the UI may display to the user an option to place or answer the call in the safe or protected mode.

The second phase is an active call phase. This phase begins once the user opts to monitor the call in the safe call mode. During this phase, periodic recording of the call may be started, for example, every 10 seconds, every 20 seconds, or at some other interval. Call data is then converted by a speech-to-text converter, and vital dimensions may be extracted from both voice and text. The transcribed text and voice samples may be fed to a call category detection engine, which may determine the call category. Once the call category engine identifies the category, the category information, call context, transcribed text, and voice samples may be fed to a machine learning-based fraud call detection engine, operating on a local ML model.

If the local model can classify the active call as fraud with a confidence, such as an 80% confidence level that the call is fraudulent (corresponding to a 20% confidence that the call is legitimate), the call may be automatically disconnected, and the user may be notified. If the local model can classify the call as legitimate with a confidence (e.g., a greater than 80% confidence that the call is legitimate), then the call may be allowed without further monitoring.

If the local model is not able to classify the sample, then the sample data may be sent to a cloud-based fraud detection engine after filtering PII information from the transcribed text. This may include context information. If the cloud model classifies the call as fraudulent with a high confidence level, then the call may be automatically disconnected and the user notified. On the other hand, if the cloud is also unable to convict or pass the call with sufficient confidence, then voice sample collection, speech-to-text conversion, context gathering, and privacy filtering may continue until a sufficient confidence is reached, until a resource usage threshold is reached, or until the call ends. If more data are sent to the cloud, the cloud may incorporate these data into its ML algorithms, to further improve the global cloud-based ML model, and the local ML model that is derived from it.

Figure 4:
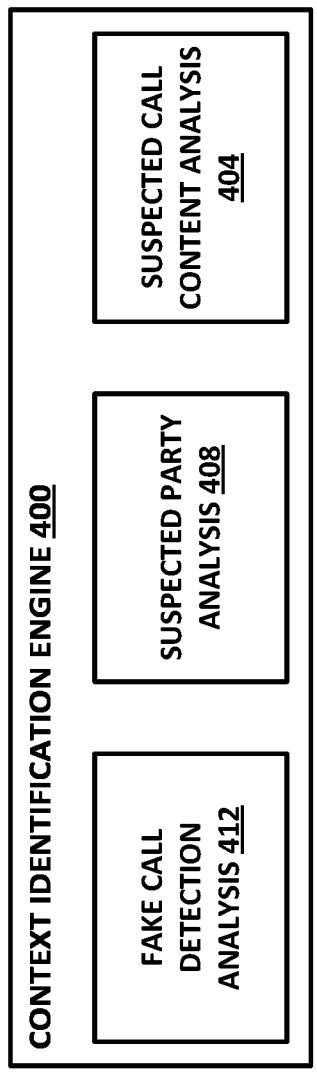
FIG. 4 is a block diagram illustrating a context identification engine.

FIG. 4 is a block diagram illustrating a context identification (ID) engine 340. Context ID engine 340 is a valuable improvement in the art. As illustrated in FIG. 4, context ID engine 340 provides, in some cases, a comprehensive approach that may include relevant parameters that can be used to identify the nature of a call. For example, turning to FIG. 4, context ID engine 400 may include fake call detection analysis 412, suspected party analysis 408, and suspected call content analysis 404.

In this approach, the model considers inputs not only from the content of the call, but also profiles the protected user for vulnerability. For example, elderly persons may be more subject to fraud calls, and are therefore more vulnerable to fraud.

Fake call detection analysis 412 may include, by way of illustrative and nonlimiting example, a profile for the callee (which may include, for example, the callee's vulnerability to scams), a determination of which applications are open on the callee's phone, information in the callee's calling history, and voice frequency (which may be used, for example, to detect stress or excitement).

Suspected party analysis 408 may include, by way of illustrative and nonlimiting example, analysis of the caller's accent and/or language, information in the call history, the caller's voice frequency (which may be used, for example, to detect stress, deceit, and/or excitement), a query of the caller's location, crowd-sources information (from a cloud or third-party sources), and a robocall identifier. Note that blocks 412 and 408 assume that the target user is the callee, and the scammer is the caller. However, as described herein, the target user could be the caller, as in cases where a fake number is advertised on a fake website, in which case the identity of "caller" and "callee" may be reversed.

Suspected call content analysis 404 may include, by way of illustrative and nonlimiting example, the time of day of the call, the length of the call, an analysis of text samples by an ML model, and information from a fraudulent call detection cloud service.

Figure 5:
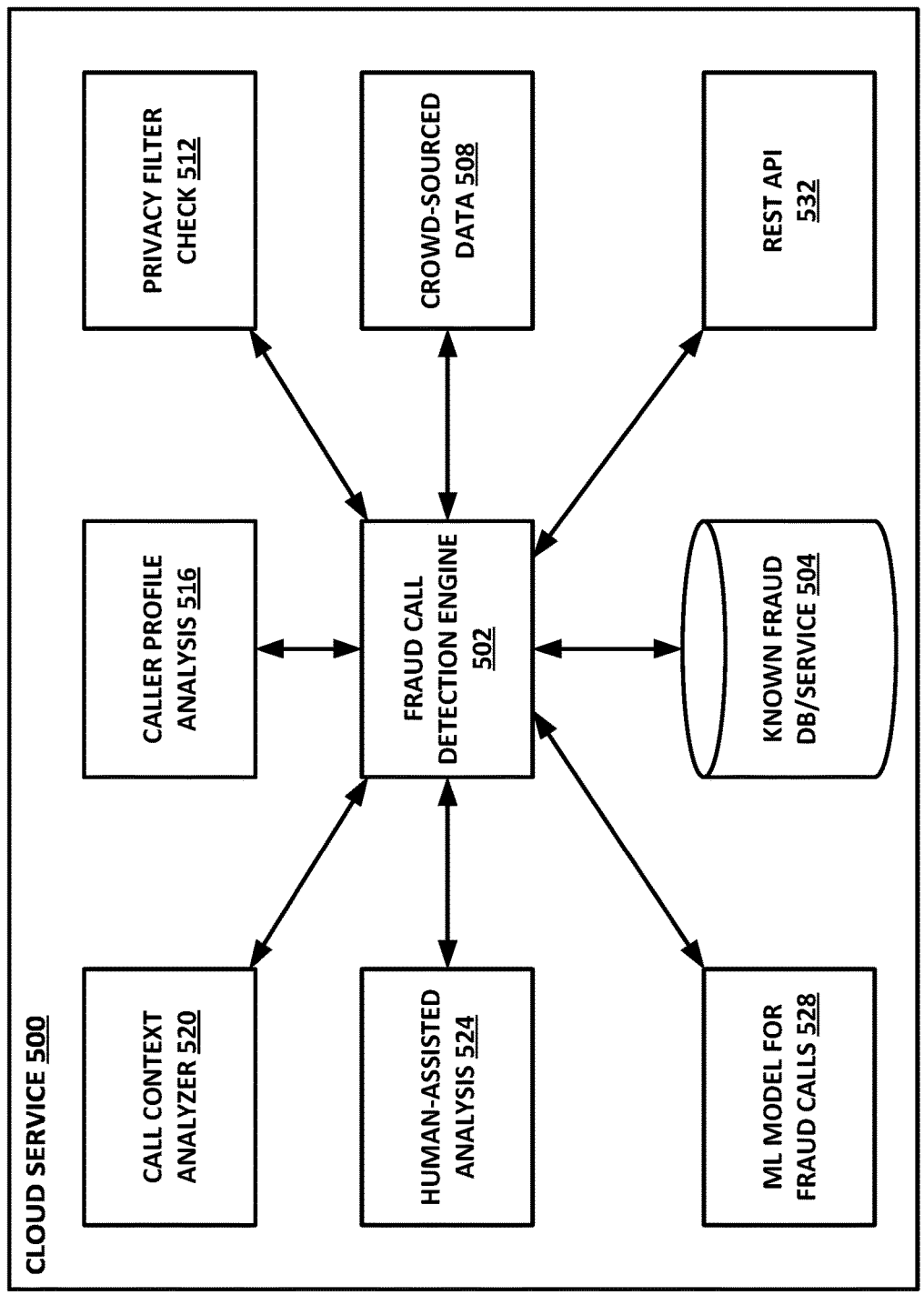
FIG. 5 is a block diagram illustrating selected elements of a cloud service.

FIG. 5 is a block diagram illustrating selected elements of a cloud service 500. Cloud service 500 provides a fraud call detection engine 502. Fraud call detection engine 502 includes, by way of illustrative and nonlimiting example, known fraud database or service 504, crowdsourced data 508, privacy filter check 512, caller profile analysis 516, call content analyzer 520, human assisted analysis 524, and an ML model 528. A REST API 532 is also provided to facilitate communication with endpoints.

REST API 532 may be used to query the classification of a call as fraud or benign by passing the call context, voice samples, and transcribed text from the client to the cloud service. The client may also use REST API 532 to submit voice samples and call context parameters for model training, and for enhancing the efficacy of fraudulent call detection. If fraud call detection engine 502 is not able to classify the call as fraudulent, it may nevertheless store context information for model training.

Known fraud database or service 504 is a backend that is used to store phone numbers that are classified as spam or fraud numbers. In some embodiments, clients may sync this database on a periodic basis to optimize the classification at the start of the call itself. Thus, if a call comes in from a known fraudulent phone number, the client can immediately convict the call before the user even answers.

Fraud call detection engine 502 may train ML model 528 on the cloud using call context, voice samples, text, and other data sent by various clients.

ML model 528 may support various languages. The ML models for different languages supported may be stored in the cloud service. Clients may periodically sync with the cloud ML model for languages configured on the client.

Crowdsourced data 508 may be used to supplement ML model 528, by collecting call and context data from a large number of clients and subscribers. As discussed above, these data may be anonymized, or otherwise filtered for privacy, to ensure that user privacy is not compromised. Thus, privacy filter check 512 ensures that crowdsourced data 508 does not include PII for the end user.

Call context analyzer 520 can be used by fraud call detection engine 502 in real-time analysis of a call, by analyzing contextual data for the call provided by the client. Call context analyzer 520 can analyze the call context to determine if contextual factors weigh for or against the call being fraudulent.

Caller profile analysis 516 may be used to analyze the caller, for example, in the case of an incoming call, or the recipient in the case of an outgoing call. This may include analyzing the caller for accent, stress, signs of deceit, or voiceprint analysis. For example, a known fraudulent caller who is prolific may have a plurality of phone numbers. If the fraudulent caller is using an unknown phone number, the call may nevertheless be convicted if the caller's voiceprint can be identified, and can be correlated to a known fraudulent caller.

As necessary or appropriate, fraud call detection engine 502 may supplement its detection using human assisted analysis 524.

Figure 6:
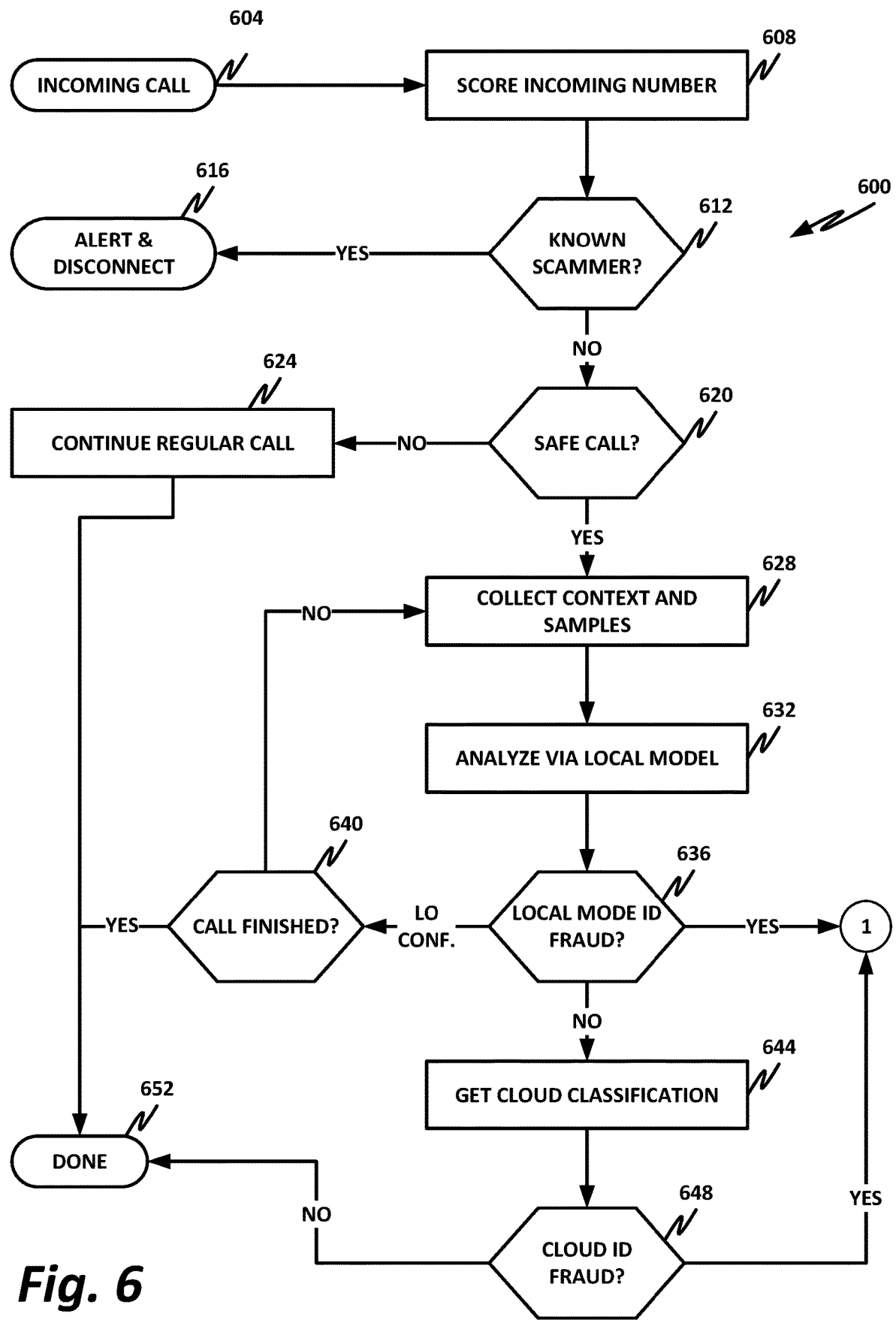
FIG. 6 is a flowchart of one illustrative example of end-to-end analysis for an incoming call.
Figure 7:
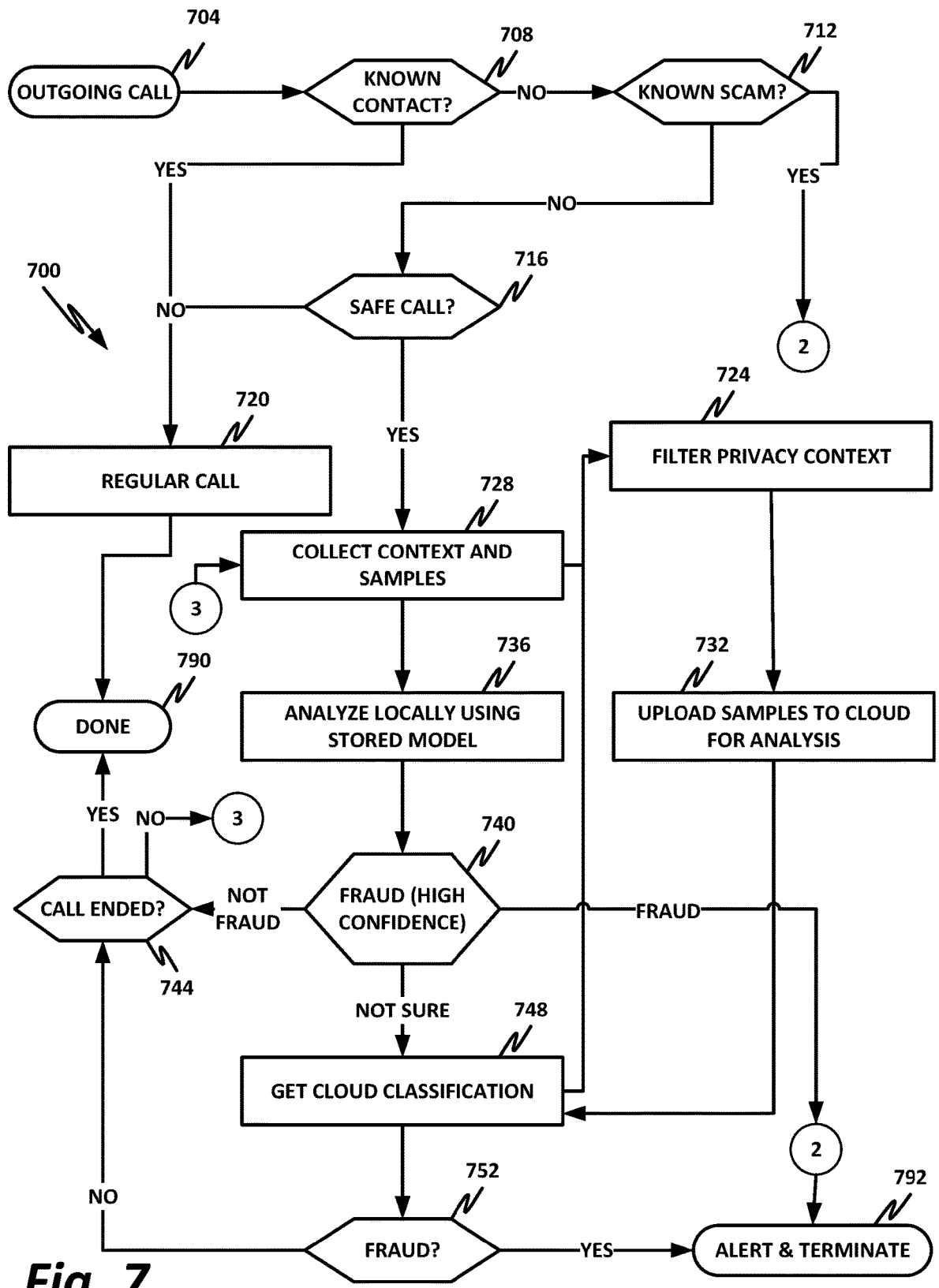
FIG. 7 is a flowchart of one illustrative example of end-to-end analysis for an outgoing call.

FIGS. 6 and 7 are flowcharts of one illustrative example of end-to-end analysis for both an incoming call (FIG. 6) and an outgoing call (FIG. 7).

Incoming calls are the most common type of fraudulent calls. Thus, the use case illustrated here is for a user receiving a call from a potential spammer trying to extract financial details from them. This solution prescreens the number and alerts the user if it is already a known spammer. If not, the user can make the call in a safe mode, where the call contents are analyzed, context identification is applied, and inputs are fed to an ML model for fraud detection.

FIG. 6 illustrates an example of a method 600 of analyzing an incoming call.

Starting at block 604, the user receives an incoming call.

In block 608, a locally-synced database, or alternatively a query to a cloud database, may be used to score the incoming number.

In decision block 612, the system determines whether the number is for a known scammer. If it is, then in block 616, the user is alerted, and the call is disconnected. Because the number is for a known scammer, there is little to no value in continuing the call.

Returning to decision block 612, if the number cannot be convicted as belonging to a known scammer, then in block 620, the system performs various filters (including, in some cases, querying a user via a UI) to determine whether to operate the call in safe mode.

If the call is not to be made in safe mode, then in block 624, the call continues as a regular call, and no further action is taken until the call finishes. In block 652, the method is done.

Returning to decision block 620, if the call is to be performed in safe mode, then in block 628, the system collects context in samples, including audio samples.

In block 632, the system may use text-to-speech analysis, keyword matching, and other analysis tools illustrated herein to analyze the call via the local model. This may be used to predict a local score for the call, including a locally-predicted probability that the call is legitimate.

In decision block 636, the system determines whether the local confidence score has determined with sufficient confidence that the call is fraudulent. If the call can be convicted with sufficient confidence (e.g., a 20% or less probability that the call is legitimate, corresponding to an 80% or higher probability that the call is fraudulent), then following on-page connector 1 to block 616, the user is alerted and the call is disconnected.

On the other hand, if the call cannot be convicted as fraudulent, then further analysis may be required. For example, in block 640, if the call is not yet finished, then control may pass back to block 628 for further local analysis. If the call is finished, then in block 652, the method is done.

Returning to decision block 636, if the call cannot be convicted or passed with sufficient confidence, then instead of (or in addition to) further local analysis, the local engine may pass data to a cloud service to get a cloud classification in block 644. In block 644, the system determines whether the cloud has returned a classification that indicates the call is fraudulent. In decision block 648, if the cloud identifies the call as fraudulent, then control passes to on-page connector 1 to block 616, and there is an alert and disconnect.

If the cloud does not identify the call as fraudulent, then in block 652, the method is done.

Although outgoing calls are a less common vector for fraud, they are nevertheless used, and they are increasing in prevalence. Thus, the flowchart of FIG. 7 illustrates a method 700 of detecting fraud on an outgoing call.

Starting in block 704, the user makes an outgoing call.

In decision block 708, the system determines whether the outgoing call is being made to a known trusted contact. If the call is to a known trusted contact, then in block 720, the call is made as a regular call (e.g., in unrestricted or non-safe mode), and in block 790, the method is done.

Returning to decision block 708, if the contact is not a known trusted contact, then in block 712, the system may query a local or cloud database to determine whether the caller is a known scam caller. If the caller is a known scam caller, then following on-page connector 2 to block 792, the user is alerted, and the call is terminated.

Returning to decision block 712, if the number is not a known scam number, then in decision block 716, the system determines whether the call is to be made in safe mode. This can include, for example, querying a user for user feedback, checking a default, and/or determining whether a call to the number has previously been characterized, whether the number has been newly added to the contact list, or on some other factor.

If the call is not to be placed in safe mode, then in block 720, it is made as a regular call, and in block 790, the method is done.

Returning to decision block 716, if it is determined that the call is to be made in safe mode, then starting in block 728, the system collects samples and context about the call for analysis. In some cases, in block 724 these data are filtered for privacy context, and in block 732, samples may be uploaded to the cloud for analysis.

In the same or in different embodiments, in block 736 the system may also analyze the call locally using a stored ML model.

In decision block 740, it is determined whether the call is fraudulent with high confidence (e.g., if there is less than a 20% probability that the call is legitimate). If the call is determined with high confidence to be fraud, then in block 792, there is an alert and terminate, and the method is done.

Alternatively, if it is determined with high confidence that the call is not fraud, then in decision block 744, it is determined whether the call has ended. If the call has not ended, then following on-page connector 3 to block 728, additional contextual data may be collected, or other samples may be taken. Note that this may continue even if the call is determined not to be fraudulent, as these data may be used to further enhance the cloud-based ML model. Thus, once these data have been filtered for privacy context, they may be uploaded to the cloud service as examples of non-fraudulent calls. On the other hand, in block 744, if the call has ended, then in block 790, the method is done.

Returning to decision block 740, if the call cannot be either convicted or passed with sufficient confidence, then in block 748, the system may attempt to get a cloud classification. This may include filtering privacy context from data in block 724, and in block 732, uploading samples to the cloud for analysis. The cloud can then return its analysis to the system in block 748.

In decision block 752, the system determines whether the call can be classified as fraudulent.

If the call cannot be classified as fraudulent, then control may pass to block 744. Alternatively, if this call can be classified as fraudulent, then in block 792, there is an alert and terminate, and the method is done.

Figure 8:
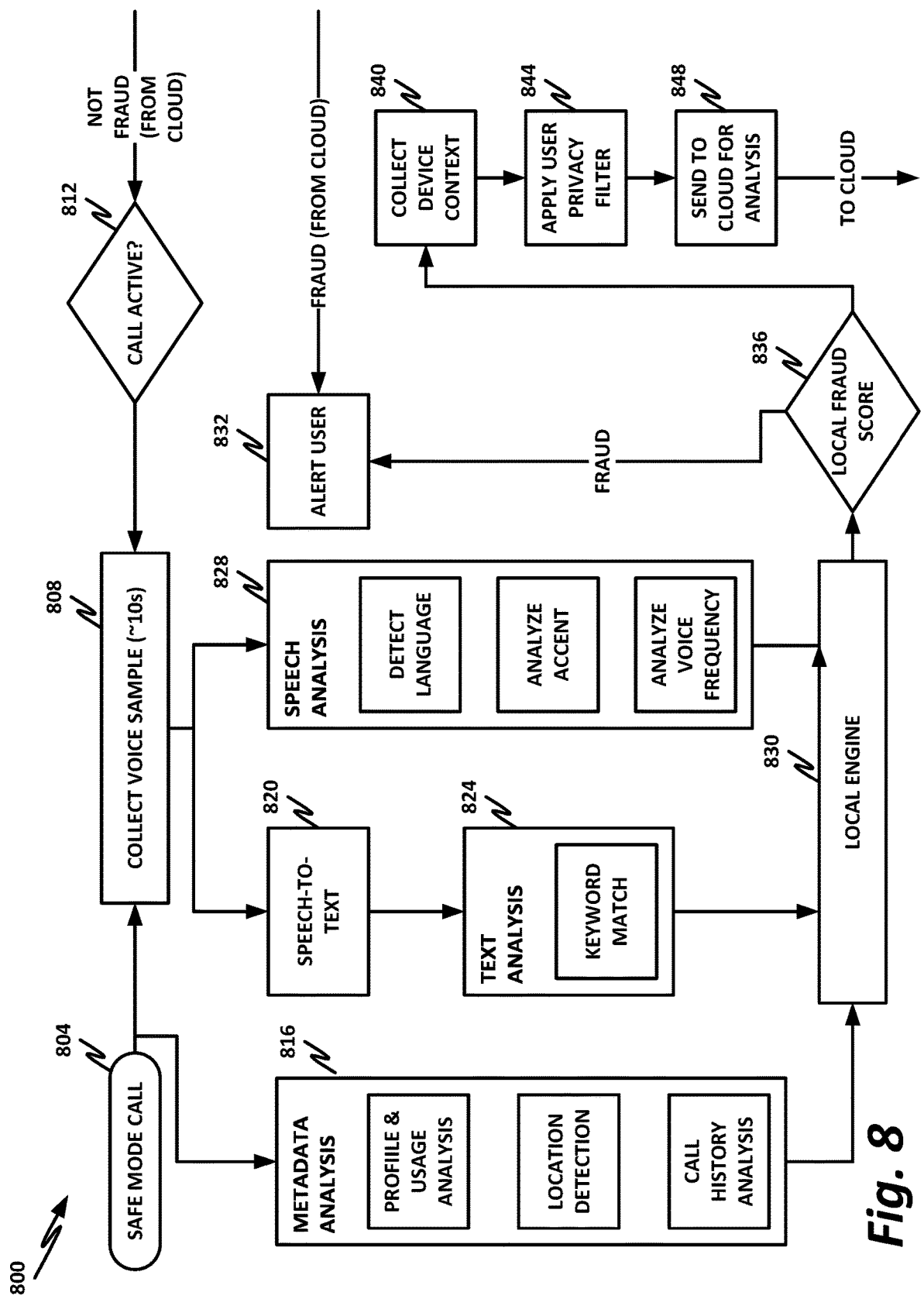
FIG. 8 illustrates an analysis pipeline of local aspects of fraud detection.

FIG. 8 illustrates an analysis pipeline 800 of local aspects of fraud detection. Because fraud detection happens in real time, some embodiments may provide the majority of the logic for performing fraud detection on the client side. Thus, client processing can be used to provide a detailed analysis not only of the contents of the call, but also of the caller's and callee's profiles and states.

Thus, analysis pipeline 800 of FIG. 8 illustrates various aspects of client side fraud detection analysis. If the pattern of the call can be identified with known spam call patterns, then the local engine is able to detect fraud and alert the user without involving the cloud in real time. In cases where there is a new spam call pattern that cannot be locally classified on the endpoint, then analysis may be offloaded to the cloud to enable more thorough detection.

In block 804, the pipeline starts with a safe mode call, which could be either an incoming or an outgoing call.

From the start of the safe mode call, analysis continues with collection of voice samples in block 808, and metadata analysis in block 816.

Metadata analysis block 816 may include analysis of metadata such as profile and usage analysis, location detection, and call history analysis. These data may be used to enhance the call detection. For example, the user's profile can indicate the user's age, technical abilities, or susceptibility to fraud to determine the user's vulnerability. Usage analysis can also help to determine the sophistication of the user, and the level of protection that may be desirable for the user. Location detection 816 can be used to determine whether the user is at home, in the office, or at some other location, to further enhance fraud detection. Call history analysis may also be used to determine whether the user has called this phone number before, whether a call to or from the number has previously been analyzed, and if there was a previous analysis, what the results of that analysis were, including a corresponding confidence. These data can then be provided to local engine 830.

In block 808, the system collects voice samples, on a sampling basis such as 10 seconds, 20 seconds, or some other sample size.

In block 820, speech-to-text conversion is performed, and in block 824, the converted text is analyzed. This can include keyword matching, regular expression matching, or other analysis. The results of this textual analysis can be provided to local engine 830, which may provide a local ML model.

In block 828, speech analysis may also be performed on the raw audio. For example, speech analysis 828 may be used to detect the language of the call, analyze the caller's accent to determine a country or region of origin, and/or analyze the voice frequency to detect stress, indicia of deceit and/or aggressiveness, or other voice factors. The result of speech analysis 828 may also be provided to local engine 830.

Local engine 830 uses the inputs to predict a local fraud score 836. Local fraud score 836 may indicate whether the call is fraudulent with a specified confidence level. If the call is determined to be fraudulent, then in block 832, the user may be alerted and the call may be terminated. If there is insufficient confidence, then the cloud may be involved. For example, in block 840, the system may collect device context, and in block 844, the system may apply a user privacy filter to the collected data. In block 848, the collected data may then be sent to the cloud for analysis.

In block 812, if the system receives from the cloud an indication that the call is not fraudulent, then in block 812, if the call is still active, then additional voice samples may be collected, and additional data (which may be anonymized, first) may be uploaded to the cloud to help the cloud build and refine its ML model.

Alternatively, if there is an indication from the cloud that the call is fraudulent, then in block 832, the user may be alerted.

FIG. 9 is a block diagram of a hardware platform 900. In at least some embodiments, hardware platform 900 may be configured or adapted to provide fraudulent call detection, according to the teachings of the present specification.

Although a particular configuration is illustrated here, there are many different configurations of hardware platforms, and this embodiment is intended to represent the class of hardware platforms that can provide a computing device. Furthermore, the designation of this embodiment as a "hardware platform" is not intended to require that all embodiments provide all elements in hardware. Some of the elements disclosed herein may be provided, in various embodiments, as hardware, software, firmware, microcode, microcode instructions, hardware instructions, hardware or software accelerators, or similar. Furthermore, in some embodiments, entire computing devices or platforms may be virtualized, on a single device, or in a data center where virtualization may span one or a plurality of devices. For example, in a "rackscale architecture" design, disaggregated computing resources may be virtualized into a single instance of a virtual device. In that case, all of the disaggregated resources that are used to build the virtual device may be considered part of hardware platform 900, even though they may be scattered across a data center, or even located in different data centers.

Hardware platform 900 is configured to provide a computing device. In various embodiments, a "computing device" may be or comprise, by way of nonlimiting example, a computer, workstation, server, mainframe, virtual machine (whether emulated or on a "bare-metal" hypervisor), network appliance, container, IoT device, high-performance computing (HPC) environment, a data center, a communications service provider infrastructure (e.g., one or more portions of an Evolved Packet Core), an in-memory computing environment, a computing system of a vehicle (e.g., an automobile or airplane), an industrial control system, embedded computer, embedded controller, embedded sensor, personal digital assistant, laptop computer, cellular telephone, internet protocol (IP) telephone, smart phone, tablet computer, convertible tablet computer, computing appliance, receiver, wearable computer, handheld calculator, or any other electronic, microelectronic, or microelectromechanical device for processing and communicating data. At least some of the methods and systems disclosed in this specification may be embodied by or carried out on a computing device.

In the illustrated example, hardware platform 900 is arranged in a point-to-point (PtP) configuration. This PtP configuration is popular for personal computer (PC) and server-type devices, although it is not so limited, and any other bus type may be used.

Hardware platform 900 is an example of a platform that may be used to implement embodiments of the teachings of this specification. For example, instructions could be stored in storage 950. Instructions could also be transmitted to the hardware platform in an ethereal form, such as via a network interface, or retrieved from another source via any suitable interconnect. Once received (from any source), the instructions may be loaded into memory 904, and may then be executed by one or more processor 902 to provide elements such as an operating system 906, operational agents 908, or data 912.

Hardware platform 900 may include several processors 902. For simplicity and clarity, only processors PROC0 902-1 and PROC1 902-2 are shown. Additional processors (such as 2, 4, 8, 16, 24, 32, 64, or 128 processors) may be provided as necessary, while in other embodiments, only one processor may be provided. Processors may have any number of cores, such as 1, 2, 4, 8, 16, 24, 32, 64, or 128 cores.

Processors 902 may be any type of processor and may communicatively couple to chipset 916 via, for example, PtP interfaces. Chipset 916 may also exchange data with other elements, such as a high-performance graphics adapter 922. In alternative embodiments, any or all of the PtP links illustrated in FIG. 9 could be implemented as any type of bus, or other configuration rather than a PtP link. In various embodiments, chipset 916 may reside on the same die or package as a processor 902 or on one or more different dies or packages. Each chipset may support any suitable number of processors 902. A chipset 916 (which may be a chipset, uncore, Northbridge, Southbridge, or other suitable logic and circuitry) may also include one or more controllers to couple other components to one or more central processor units (CPUs).

Two memories, 904-1 and 904-2 are shown, connected to PROC0 902-1 and PROC1 902-2, respectively. As an example, each processor is shown connected to its memory in a direct memory access (DMA) configuration, though other memory architectures are possible, including ones in which memory 904 communicates with a processor 902 via a bus. For example, some memories may be connected via a system bus, or in a data center, memory may be accessible in a remote DMA (RDMA) configuration.

Memory 904 may include any form of volatile or non-volatile memory including, without limitation, magnetic media (e.g., one or more tape drives), optical media, flash, random access memory (RAM), double data rate RAM (DDR RAM) nonvolatile RAM (NVRAM), static RAM (SRAM), dynamic RAM (DRAM), persistent RAM (PRAM), data-centric (DC) persistent memory (e.g., Intel Optane/3D-crosspoint), cache, Layer 1 (L1) or Layer 2 (L2) memory, on-chip memory, registers, virtual memory region, read-only memory (ROM), flash memory, removable media, tape drive, cloud storage, or any other suitable local or remote memory component or components. Memory 904 may be used for short, medium, and/or long-term storage. Memory 904 may store any suitable data or information utilized by platform logic. In some embodiments, memory 904 may also comprise storage for instructions that may be executed by the cores of processors 902 or other processing elements (e.g., logic resident on chipsets 916) to provide functionality.

In certain embodiments, memory 904 may comprise a relatively low-latency volatile main memory, while storage 950 may comprise a relatively higher-latency nonvolatile memory. However, memory 904 and storage 950 need not be physically separate devices, and in some examples may represent simply a logical separation of function (if there is any separation at all). It should also be noted that although DMA is disclosed by way of nonlimiting example, DMA is not the only protocol consistent with this specification, and that other memory architectures are available.

Certain computing devices provide main memory 904 and storage 950, for example, in a single physical memory device, and in other cases, memory 904 and/or storage 950 are functionally distributed across many physical devices. In the case of virtual machines or hypervisors, all or part of a function may be provided in the form of software or firmware running over a virtualization layer to provide the logical function, and resources such as memory, storage, and accelerators may be disaggregated (i.e., located in different physical locations across a data center). In other examples, a device such as a network interface may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, hardware instructions, microcode, programmable logic, or objects that can coordinate to achieve a logical operation.

Graphics adapter 922 may be configured to provide a human-readable visual output, such as a command-line interface (CLI) or graphical desktop such as Microsoft Windows, Apple OSX desktop, or a Unix/Linux X Window System-based desktop. Graphics adapter 922 may provide output in any suitable format, such as a coaxial output, composite video, component video, video graphics array (VGA), or digital outputs such as digital visual interface (DVI), FPDLink, DisplayPort, or high-definition multimedia interface (HDMI), by way of nonlimiting example. In some examples, graphics adapter 922 may include a hardware graphics card, which may have its own memory and its own graphics processing unit (GPU).

Chipset 916 may be in communication with a bus 928 via an interface circuit. Bus 928 may have one or more devices that communicate over it, such as a bus bridge 932, I/O devices 935, accelerators 946, communication devices 940, and a keyboard and/or mouse 938, by way of nonlimiting example. In general terms, the elements of hardware platform 900 may be coupled together in any suitable manner. For example, a bus may couple any of the components together. A bus may include any known interconnect, such as a multi-drop bus, a mesh interconnect, a fabric, a ring interconnect, a round-robin protocol, a PtP interconnect, a serial interconnect, a parallel bus, a coherent (e.g., cache coherent) bus, a layered protocol architecture, a differential bus, or a Gunning transceiver logic (GTL) bus, by way of illustrative and nonlimiting example.

Communication devices 940 can broadly include any communication not covered by a network interface and the various I/O devices described herein. This may include, for example, various universal serial bus (USB), FireWire, Lightning, or other serial or parallel devices that provide communications.

I/O Devices 935 may be configured to interface with any auxiliary device that connects to hardware platform 900 but that is not necessarily a part of the core architecture of hardware platform 900. A peripheral may be operable to provide extended functionality to hardware platform 900, and may or may not be wholly dependent on hardware platform 900. In some cases, a peripheral may be a computing device in its own right. Peripherals may include input and output devices such as displays, terminals, printers, keyboards, mice, modems, data ports (e.g., serial, parallel, USB, Firewire, or similar), network controllers, optical media, external storage, sensors, transducers, actuators, controllers, data acquisition buses, cameras, microphones, speakers, or external storage, by way of nonlimiting example.

In one example, audio I/O 942 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth, or WiFi audio, by way of nonlimiting example. Audio input may also be provided via similar interfaces, in an analog or digital form.

Bus bridge 932 may be in communication with other devices such as a keyboard/mouse 938 (or other input devices such as a touch screen, trackball, etc.), communication devices 940 (such as modems, network interface devices, peripheral interfaces such as PCI or PCIe, or other types of communication devices that may communicate through a network), audio I/O 942, and/or accelerators 946. In alternative embodiments, any portions of the bus architectures could be implemented with one or more PtP links.

Operating system 906 may be, for example, Microsoft Windows, Linux, UNIX, Mac OS X, IOS, MS-DOS, or an embedded or real-time operating system (including embedded or real-time flavors of the foregoing). In some embodiments, a hardware platform 900 may function as a host platform for one or more guest systems that invoke application (e.g., operational agents 908).

Operational agents 908 may include one or more computing engines that may include one or more non-transitory computer-readable mediums having stored thereon executable instructions operable to instruct a processor to provide operational functions. At an appropriate time, such as upon booting hardware platform 900 or upon a command from operating system 906 or a user or security administrator, a processor 902 may retrieve a copy of the operational agent (or software portions thereof) from storage 950 and load it into memory 904. Processor 902 may then iteratively execute the instructions of operational agents 908 to provide the desired methods or functions.

As used throughout this specification, an "engine" includes any combination of one or more logic elements, of similar or dissimilar species, operable for and configured to perform one or more methods provided by the engine. In some cases, the engine may be or include a special integrated circuit designed to carry out a method or a part thereof, a field-programmable gate array (FPGA) programmed to provide a function, a special hardware or microcode instruction, other programmable logic, and/or software instructions operable to instruct a processor to perform the method. In some cases, the engine may run as a "daemon" process, background process, terminate-and-stay-resident program, a service, system extension, control panel, bootup procedure, basic in/output system (BIOS) subroutine, or any similar program that operates with or without direct user interaction. In certain embodiments, some engines may run with elevated privileges in a "driver space" associated with ring 0, 1, or 2 in a protection ring architecture. The engine may also include other hardware, software, and/or data, including configuration files, registry entries, application programming interfaces (APIs), and interactive or user-mode software by way of nonlimiting example.

In some cases, the function of an engine is described in terms of a "circuit" or "circuitry to" perform a particular function. The terms "circuit" and "circuitry" should be understood to include both the physical circuit, and in the case of a programmable circuit, any instructions or data used to program or configure the circuit.

Where elements of an engine are embodied in software, computer program instructions may be implemented in programming languages, such as an object code, an assembly language, or a high-level language such as OpenCL, FORTRAN, C, C++, JAVA, or HTML. These may be used with any compatible operating systems or operating environments. Hardware elements may be designed manually, or with a hardware description language such as Spice, Verilog, and Very High Speed Integrated Circuits (VHSIC) Hardware Description Language (VHDL). The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

A network interface may be provided to communicatively couple hardware platform 900 to a wired or wireless network or fabric. A "network," as used throughout this specification, may include any communicative platform operable to exchange data or information within or between computing devices, including, by way of nonlimiting example, a local network, a switching fabric, an ad-hoc local network, Ethernet (e.g., as defined by the IEEE 802.3 standard), Fiber Channel, InfiniBand, WiFi, or other suitable standard. Intel Omni-Path Architecture (OPA), TrueScale, Ultra Path Interconnect (UPI) (formerly called QPI or KTI), FibreChannel, Ethernet, FibreChannel over Ethernet (FCOE), InfiniBand, PCI, PCIe, fiber optics, millimeter wave guide, an internet architecture, a packet data network (PDN) offering a communications interface or exchange between any two nodes in a system, a local area network (LAN), metropolitan area network (MAN), wide area network (WAN), wireless local area network (WLAN), virtual private network (VPN), intranet, plain old telephone system (POTS), or any other appropriate architecture or system that facilitates communications in a network or telephonic environment, either with or without human interaction or intervention. A network interface may include one or more physical ports that may couple to a cable (e.g., an Ethernet cable, other cable, or waveguide).

In some cases, some or all of the components of hardware platform 900 may be virtualized, in particular the processor(s) and memory. For example, a virtualized environment may run on OS 906, or OS 906 could be replaced with a hypervisor or virtual machine manager. In this configuration, a virtual machine running on hardware platform 900 may virtualize workloads. A virtual machine in this configuration may perform essentially all of the functions of a physical hardware platform.

In a general sense, any suitably-configured processor can execute any type of instructions associated with the data to achieve the operations illustrated in this specification. Any of the processors or cores disclosed herein could transform an element or an article (for example, data) from one state or thing to another state or thing. In another example, some activities outlined herein may be implemented with fixed logic or programmable logic (for example, software and/or computer instructions executed by a processor).

Various components of the system depicted in FIG. 9 may be combined in a SoC architecture or in any other suitable configuration. For example, embodiments disclosed herein can be incorporated into systems including mobile devices such as smart cellular telephones, tablet computers, personal digital assistants, portable gaming devices, and similar. These mobile devices may be provided with SoC architectures in at least some embodiments. An example of such an embodiment is provided in FIG. 10. Such an SoC (and any other hardware platform disclosed herein) may include analog, digital, and/or mixed-signal, radio frequency (RF), or similar processing elements. Other embodiments may include a multichip module (MCM), with a plurality of chips located within a single electronic package and configured to interact closely with each other through the electronic package. In various other embodiments, the computing functionalities disclosed herein may be implemented in one or more silicon cores in application-specific integrated circuits (ASICs), FPGAS, and other semiconductor chips.

FIG. 10 is a block illustrating selected elements of an example SoC 1000. In at least some embodiments, SoC 1000 may be configured or adapted to provide fraudulent call detection, according to the teachings of the present specification.

At least some of the teachings of the present specification may be embodied on an SoC 1000, or may be paired with an SoC 1000. SoC 1000 may include, or may be paired with, an advanced reduced instruction set computer machine (ARM) component. For example, SoC 1000 may include or be paired with any ARM core, such as A-9, A-15, or similar. This architecture represents a hardware platform that may be useful in devices such as tablets and smartphones, by way of illustrative example, including Android phones or tablets, iPhone (of any version), iPad, Google Nexus, Microsoft Surface. SoC 1000 could also be integrated into, for example, a PC, server, video processing components, laptop computer, notebook computer, netbook, or touch-enabled device.

As with hardware platform 900 above, SoC 1000 may include multiple cores 1002-1 and 1002-2. In this illustrative example, SoC 1000 also includes an L2 cache control 1004, a GPU 1006, a video codec 1008, a liquid crystal display (LCD) I/F 1010 and an interconnect 1012. L2 cache control 1004 can include a bus interface unit 1014, a L2 cache 1016. Liquid crystal display (LCD) I/F 1010 may be associated with mobile industry processor interface (MIPI)/HDMI links that couple to an LCD.

SoC 1000 may also include a subscriber identity module (SIM) I/F 1018, a boot ROM 1020, a synchronous dynamic random access memory (SDRAM) controller 1022, a flash controller 1024, a serial peripheral interface (SPI) director 1028, a suitable power control 1030, a dynamic RAM (DRAM) 1032, and flash 1034. In addition, one or more embodiments include one or more communication capabilities, interfaces, and features such as instances of Bluetooth, a 3G modem, a global positioning system (GPS), and an 802.11 WiFi.

Designers of integrated circuits such as SoC 1000 (or other integrated circuits) may use intellectual property (IP) blocks to simplify system design. An IP block is a modular, self-contained hardware block that can be easily integrated into the design. Because the IP block is modular and self-contained, the integrated circuit (IC) designer need only "drop in" the IP block to use the functionality of the IP block. The system designer can then make the appropriate connections to inputs and outputs.

IP blocks are often "black boxes." In other words, the system integrator using the IP block may not know, and need not know, the specific implementation details of the IP block. Indeed, IP blocks may be provided as proprietary third-party units, with no insight into the design of the IP block by the system integrator.

For example, a system integrator designing an SoC for a smart phone may use IP blocks in addition to the processor core, such as a memory controller, a nonvolatile memory (NVM) controller, WiFi, Bluetooth, GPS, a fourth or fifth-generation network (4G or 5G), an audio processor, a video processor, an image processor, a graphics engine, a GPU engine, a security controller, and many other IP blocks. In many cases, each of these IP blocks has its own embedded microcontroller.

Figure 11:
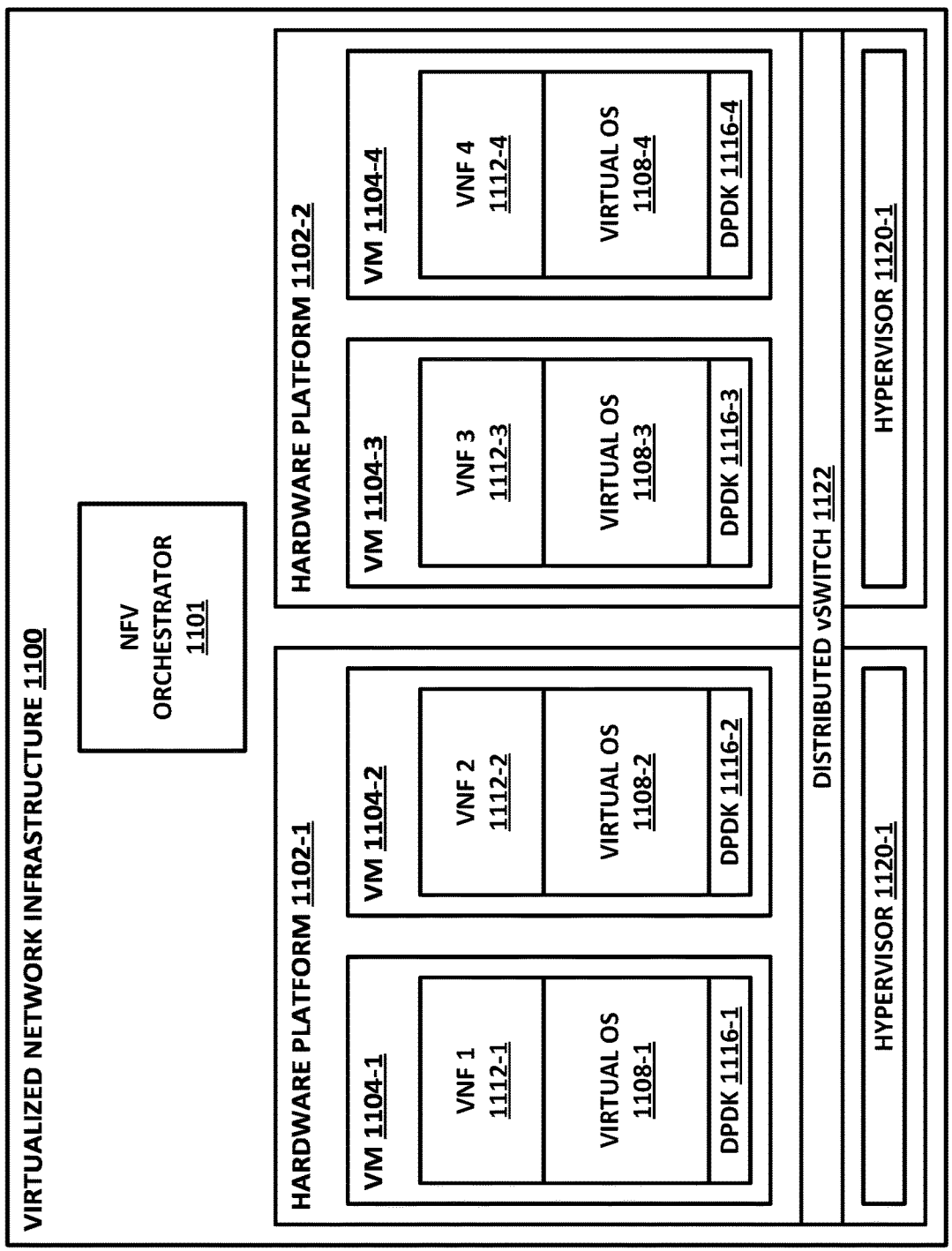
FIG. 11 is a block diagram illustrating selected elements of a network function virtualization (NFV) infrastructure.

FIG. 11 is a block diagram of a NFV infrastructure 1100. A virtualization infrastructure such as the one illustrated in FIG. 11 could be used in conjunction with embodiments of this disclosure.

NFV is an aspect of network virtualization that is generally considered distinct from, but that can still interoperate with, software-defined networking (SDN). For example, virtual network functions (VNFs) may operate within the data plane of an SDN deployment. NFV was originally envisioned as a method for providing reduced capital expenditure (Capex) and operating expenses (Opex) for telecommunication services. One feature of NFV is replacing proprietary, special-purpose hardware appliances with virtual appliances running on commercial off-the-shelf (COTS) hardware within a virtualized environment. In addition to Capex and Opex savings, NFV provides a more agile and adaptable network. As network loads change, VNFs can be provisioned ("spun-up") or removed ("spun down") to meet network demands. For example, in times of high load, more load balancing VNFs may be spun-up to distribute traffic to more workload servers (which may themselves be virtual machines). In times when more suspicious traffic is experienced, additional firewalls or deep packet inspection (DPI) appliances may be needed.

Because NFV started out as a telecommunications feature, many NFV instances are focused on telecommunications. However, NFV is not limited to telecommunication services. In a broad sense, NFV includes one or more VNFs running within a network function virtualization infrastructure (NFVI), such as NFVI 1100. Often, the VNFs are inline service functions that are separate from workload servers or other nodes. These VNFs can be chained together into a service chain, which may be defined by a virtual subnetwork, and which may include a serial string of network services that provide behind-the-scenes work, such as security, logging, billing, and similar.

In the example of FIG. 11, an NFV orchestrator 1101 manages a number of the VNFs 1112 running on an NFVI 1100. NFV requires nontrivial resource management, such as allocating a very large pool of compute resources among appropriate numbers of instances of each VNF, managing connections between VNFs, determining how many instances of each VNF to allocate, and managing memory, storage, and network connections. This may require complex software management, thus making NFV orchestrator 1101 a valuable system resource. Note that NFV orchestrator 1101 may provide a browser-based or graphical configuration interface, and in some embodiments may be integrated with SDN orchestration functions.

Note that NFV orchestrator 1101 itself may be virtualized (rather than a special-purpose hardware appliance). NFV orchestrator 1101 may be integrated within an existing SDN system, wherein an operations support system (OSS) manages the SDN. This may interact with cloud resource management systems (e.g., OpenStack) to provide NFV orchestration. An NFVI 1100 may include the hardware, software, and other infrastructure to enable VNFs to run. This may include a hardware platform 1102 on which one or more VMs 1104 may run. For example, hardware platform 1102-1 in this example runs VMs 1104-1 and 1104-2. Hardware platform 1102-2 runs VMs 1104-3 and 1104-4. Each hardware platform may include a hypervisor 1120, virtual machine manager (VMM), or similar function, which may include and run on a native (bare-metal) operating system, which may be minimal so as to consume very few resources.

Hardware platforms 1102 may be or comprise a rack or several racks of blade or slot servers (including, e.g., processors, memory, and storage), one or more data centers, other hardware resources distributed across one or more geographic locations, hardware switches, or network interfaces. An NFVI 1100 may also include the software architecture that enables hypervisors to run and be managed by NFV orchestrator 1101.

Running on NFVI 1100 are a number of VMS 1104, each of which in this example is a VNF providing a virtual service appliance. Each VM 1104 in this example includes an instance of the Data Plane Development Kit (DPDK), a virtual operating system 1108, and an application providing the VNF 1112.

Virtualized network functions could include, as nonlimiting and illustrative examples, firewalls, intrusion detection systems, load balancers, routers, session border controllers, DPI services, network address translation (NAT) modules, or call security association.

The illustration of FIG. 11 shows that a number of VNFs 1104 have been provisioned and exist within NFVI 1100. This FIGURE does not necessarily illustrate any relationship between the VNFs and the larger network, or the packet flows that NFVI 1100 may employ.

The illustrated DPDK instances 1116 provide a set of highly-optimized libraries for communicating across a virtual switch (vSwitch) 1122. Like VMs 1104, vSwitch 1122 is provisioned and allocated by a hypervisor 1120. The hypervisor uses a network interface to connect the hardware platform to the data center fabric (e.g., a host fabric interface (HFI)). This HFI may be shared by all VMs 1104 running on a hardware platform 1102. Thus, a vSwitch may be allocated to switch traffic between VMs 1104. The vSwitch may be a pure software vSwitch (e.g., a shared memory vSwitch), which may be optimized so that data are not moved between memory locations, but rather, the data may stay in one place, and pointers may be passed between VMs 1104 to simulate data moving between ingress and egress ports of the vSwitch. The vSwitch may also include a hardware driver (e.g., a hardware network interface IP block that switches traffic, but that connects to virtual ports rather than physical ports). In this illustration, a distributed vSwitch 1122 is illustrated, wherein vSwitch 1122 is shared between two or more physical hardware platforms 1102.

Figure 12:
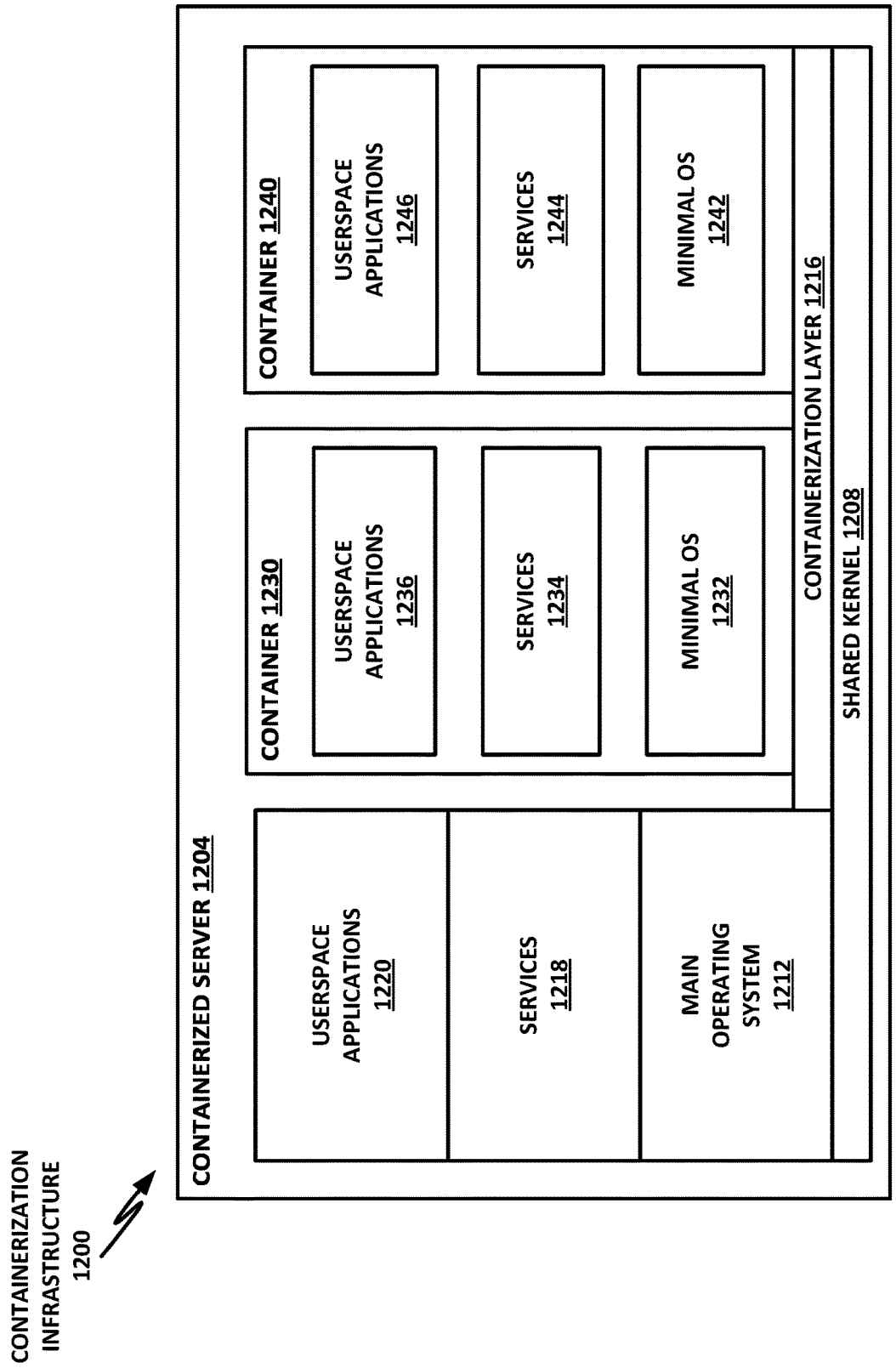
FIG. 12 is a block diagram illustrating selected elements of a containerization infrastructure.

FIG. 12 is a block diagram of selected elements of a containerization infrastructure 1200. A containerization infrastructure such as the one illustrated in FIG. 12 could be used in conjunction with embodiments of this disclosure. Like virtualization, containerization is a popular form of providing a guest infrastructure.

Containerization infrastructure 1200 runs on a hardware platform such as containerized server 1204. Containerized server 1204 may provide a number of processors, memory, one or more network interfaces, accelerators, and/or other hardware resources.

Running on containerized server 1204 is a shared kernel 1208. One distinction between containerization and virtualization is that containers run on a common kernel with the main operating system and with each other. In contrast, in virtualization, the processor and other hardware resources are abstracted or virtualized, and each virtual machine provides its own kernel on the virtualized hardware.

Running on shared kernel 1208 is main operating system 1212. Commonly, main operating system 1212 is a Unix or Linux-based operating system, although containerization infrastructure is also available for other types of systems, including Microsoft Windows systems and Macintosh systems. Running on top of main operating system 1212 is a containerization layer 1216. For example, Docker is a popular containerization layer that runs on a number of operating systems, and relies on the Docker daemon. Newer operating systems (including Fedora Linux 32 and later) that use version 2 of the kernel control groups service (cgroups v2) feature appear to be incompatible with the Docker daemon. Thus, these systems may run with an alternative known as Podman that provides a containerization layer without a daemon.

Various factions debate the advantages and/or disadvantages of using a daemon-based containerization layer versus one without a daemon, like Podman. Such debates are outside the scope of the present specification, and when the present specification speaks of containerization, it is intended to include containerization layers, whether or not they require the use of a daemon.

Main operating system 1212 may also include a number of services 1218, which provide services and interprocess communication to userspace applications 1220.

Services 1218 and userspace applications 1220 in this illustration are independent of any container.

As discussed above, a difference between containerization and virtualization is that containerization relies on a shared kernel. However, to maintain virtualization-like segregation, containers do not share interprocess communications, services, or many other resources. Some sharing of resources between containers can be approximated by permitting containers to map their internal file systems to a common mount point on the external file system. Because containers have a shared kernel with the main operating system 1212, they inherit the same file and resource access permissions as those provided by shared kernel 1208. For example, one popular application for containers is to run a plurality of web servers on the same physical hardware. The Docker daemon provides a shared socket, docker.sock, that is accessible by containers running under the same Docker daemon. Thus, one container can be configured to provide only a reverse proxy for mapping hypertext transfer protocol (HTTP) and hypertext transfer protocol secure (HTTPS) requests to various containers. This reverse proxy container can listen on docker.sock for newly spun-up containers. When a container spins up that meets certain criteria, such as by specifying a listening port and/or virtual host, the reverse proxy can map HTTP or HTTPS requests to the specified virtual host to the designated virtual port. Thus, only the reverse proxy host may listen on ports 80 and 443, and any request to subdomain1.example.com may be directed to a virtual port on a first container, while requests to subdomain2.example.com may be directed to a virtual port on a second container.

Other than this limited sharing of files or resources, which generally is explicitly configured by an administrator of containerized server 1204, the containers themselves are completely isolated from one another. However, because they share the same kernel, it is relatively easier to dynamically allocate compute resources such as CPU time and memory to the various containers. Furthermore, it is common practice to provide only a minimum set of services on a specific container, and the container does not need to include a full bootstrap loader because it shares the kernel with a containerization host (i.e., containerized server 1204).

Thus, "spinning up" a container is often relatively faster than spinning up a new virtual machine that provides a similar service. Furthermore, a containerization host does not need to virtualize hardware resources, so containers access those resources natively and directly. While this provides some theoretical advantages over virtualization, modern hypervisors—especially type 1, or "bare-metal," hypervisors—provide such near-native performance that this advantage may not always be realized.

In this example, containerized server 1204 hosts two containers, namely container 1230 and container 1240.

Container 1230 may include a minimal operating system 1232 that runs on top of shared kernel 1208. Note that a minimal operating system is provided as an illustrative example, and is not mandatory. In fact, container 1230 may perform as full an operating system as is necessary or desirable. Minimal operating system 1232 is used here as an example simply to illustrate that in common practice, the minimal operating system necessary to support the function of the container (which in common practice, is a single or monolithic function) is provided.

On top of minimal operating system 1232, container 1230 may provide one or more services 1234. Finally, on top of services 1234, container 1230 may also provide a number of userspace applications 1236, as necessary.

Container 1240 may include a minimal operating system 1242 that runs on top of shared kernel 1208. Note that a minimal operating system is provided as an illustrative example, and is not mandatory. In fact, container 1240 may perform as full an operating system as is necessary or desirable. Minimal operating system 1242 is used here as an example simply to illustrate that in common practice, the minimal operating system necessary to support the function of the container (which in common practice, is a single or monolithic function) is provided.

On top of minimal operating system 1242, container 1240 may provide one or more services 1244. Finally, on top of services 1244, container 1240 may also provide a number of userspace applications 1246, as necessary.

Using containerization layer 1216, containerized server 1204 may run a number of discrete containers, each one providing the minimal operating system and/or services necessary to provide a particular function. For example, containerized server 1204 could include a mail server, a web server, a secure shell server, a file server, a weblog, cron services, a database server, and many other types of services. In theory, these could all be provided in a single container, but security and modularity advantages are realized by providing each of these discrete functions in a discrete container with its own minimal operating system necessary to provide those services.

Figure 13:
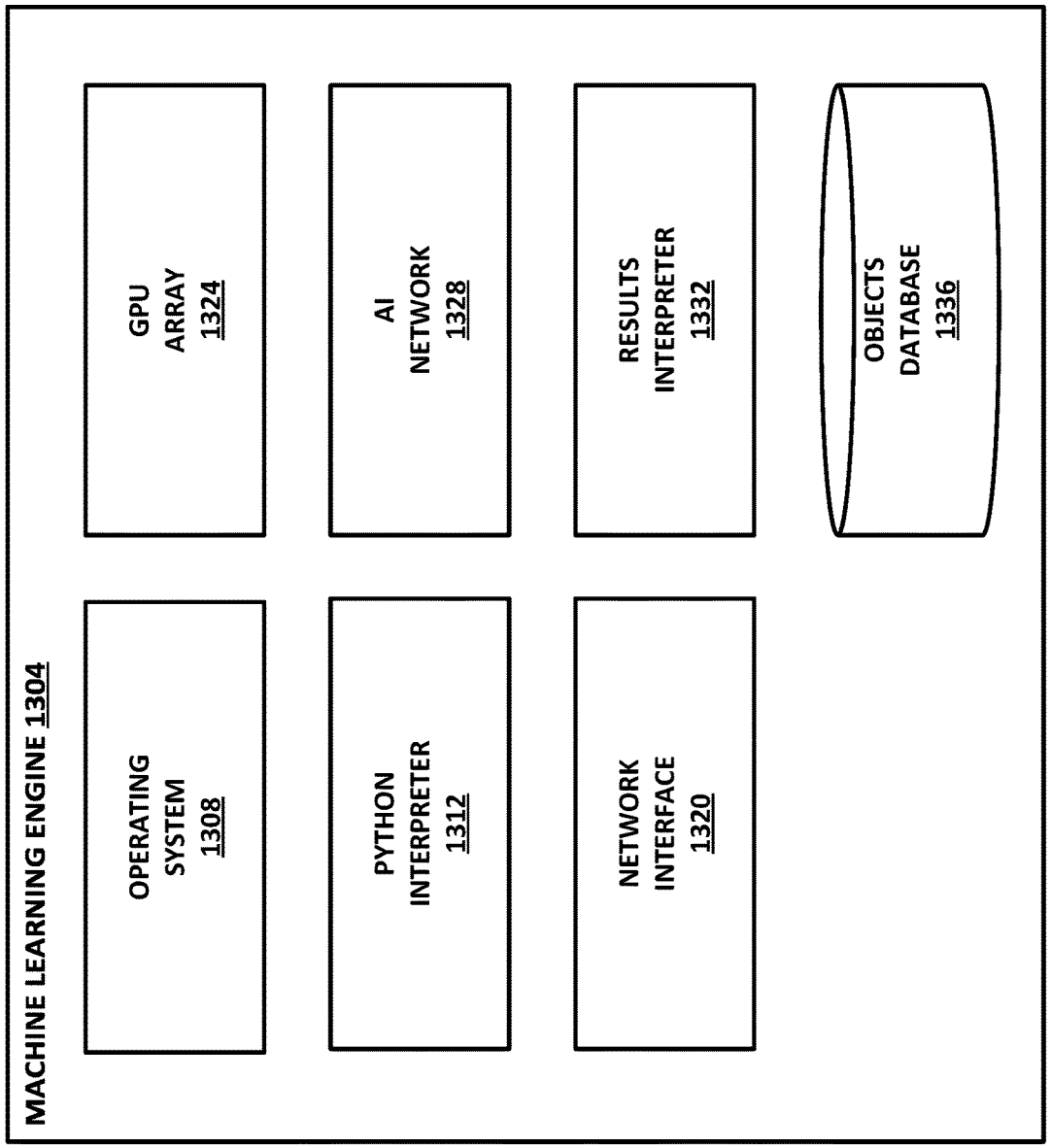
FIG. 13 is a block diagram illustrating selected elements of a machine learning engine.

FIG. 13 is a block diagram illustrating selected elements of a ML engine 1304. ML engine 1304 may be configured to provide analysis services, such as via a neural network. FIG. 13 illustrates a platform for providing analysis services. Analysis, such as neural analysis and other ML models, may be used in some embodiments to provide one or more features of the present disclosure.

Note that ML engine 1304 is illustrated here as a single modular object, but in some cases, different aspects of ML engine 1304 could be provided by separate hardware, or by separate guests (e.g., virtual machines or containers) on a hardware system.

ML engine 1304 includes an operating system 1308. Commonly, operating system 1308 is a Linux operating system, although other operating systems, such as Microsoft Windows, Mac OS X, or similar could be used. ML engine 1304 also includes a Python interpreter 1312, which can be used to run Python programs. A Python module known as Numerical Python (NumPy) is often used for neural network analysis. Although this is a popular choice, other non-Python or non-NumPy-based systems could also be used. For example, the neural network could be implemented in Matrix Laboratory (MATLAB), C, C++, Fortran, R, or some other compiled or interpreted computer language.

GPU array 1324 may include an array of graphics processing units that may be used to carry out the neural network functions of neural network 1328. Note that GPU arrays are a popular choice for this kind of processing, but neural networks can also be implemented in CPUs, or in ASICs or FPGAs that are specially designed to implement the neural network.

Neural network 1328 includes the actual code for carrying out the neural network, and as mentioned above, is commonly programmed in Python.

Results interpreter 1332 may include logic separate from the neural network functions that can be used to operate on the outputs of the neural network to assign the object for particular classification, perform additional analysis, and/or provide a recommended remedial action.

Objects database 1336 may include a database of known malware objects and their classifications. Neural network 1328 may initially be trained on objects within objects database 1336, and as new objects are identified, objects database 1336 may be updated with the results of additional neural network analysis.

Once final results have been obtained, the results may be sent to an appropriate destination via network interface 1320.

The foregoing outlines features of several embodiments so that those skilled in the art may better understand various aspects of the present disclosure. The embodiments disclosed can readily be used as the basis for designing or modifying other processes and structures to carry out the teachings of the present specification. Any equivalent constructions to those disclosed do not depart from the spirit and scope of the present disclosure. Design considerations may result in substitute arrangements, design choices, device possibilities, hardware configurations, software implementations, and equipment options.

As used throughout this specification, a "memory" is expressly intended to include both a volatile memory and a nonvolatile memory. Thus, for example, an "engine" as described above could include instructions encoded within a memory that, when executed, instruct a processor to perform the operations of any of the methods or procedures disclosed herein. It is expressly intended that this configuration reads on a computing apparatus "sitting on a shelf" in a non-operational state. For example, in this example, the "memory" could include one or more tangible, non-transitory computer-readable storage media that contain stored instructions. These instructions, in conjunction with the hardware platform (including a processor) on which they are stored may constitute a computing apparatus.

In other embodiments, a computing apparatus may also read on an operating device. For example, in this configuration, the "memory" could include a volatile or run-time memory (e.g., RAM), where instructions have already been loaded. These instructions, when fetched by the processor and executed, may provide methods or procedures as described herein.

In yet another embodiment, there may be one or more tangible, non-transitory computer-readable storage media having stored thereon executable instructions that, when executed, cause a hardware platform or other computing system, to carry out a method or procedure. For example, the instructions could be executable object code, including software instructions executable by a processor. The one or more tangible, non-transitory computer-readable storage media could include, by way of illustrative and nonlimiting example, a magnetic media (e.g., hard drive), a flash memory, a ROM, optical media (e.g., CD, DVD, Blu-Ray), nonvolatile random access memory (NVRAM), nonvolatile memory (NVM) (e.g., Intel 3D Xpoint), or other non-transitory memory.

There are also provided herein certain methods, illustrated for example in flow charts and/or signal flow diagrams. The order or operations disclosed in these methods discloses one illustrative ordering that may be used in some embodiments, but this ordering is no intended to be restrictive, unless expressly stated otherwise. In other embodiments, the operations may be carried out in other logical orders. In general, one operation should be deemed to necessarily precede another only if the first operation provides a result required for the second operation to execute. Furthermore, the sequence of operations itself should be understood to be a nonlimiting example. In appropriate embodiments, some operations may be omitted as unnecessary or undesirable. In the same or in different embodiments, other operations not shown may be included in the method to provide additional results.

In certain embodiments, some of the components illustrated herein may be omitted or consolidated. In a general sense, the arrangements depicted in the FIGURES may be more logical in their representations, whereas a physical architecture may include various permutations, combinations, and/or hybrids of these elements.

With the numerous examples provided herein, interaction may be described in terms of two, three, four, or more electrical components. These descriptions are provided for purposes of clarity and example only. Any of the illustrated components, modules, and elements of the FIGURES may be combined in various configurations, all of which fall within the scope of this specification.

In certain cases, it may be easier to describe one or more functionalities by disclosing only selected element. Such elements are selected to illustrate specific information to facilitate the description. The inclusion of an element in the FIGURES is not intended to imply that the element must appear in the disclosure, as claimed, and the exclusion of certain elements from the FIGURES is not intended to imply that the element is to be excluded from the disclosure as claimed. Similarly, any methods or flows illustrated herein are provided by way of illustration only. Inclusion or exclusion of operations in such methods or flows should be understood the same as inclusion or exclusion of other elements as described in this paragraph. Where operations are illustrated in a particular order, the order is a nonlimiting example only. Unless expressly specified, the order of operations may be altered to suit a particular embodiment.

Other changes, substitutions, variations, alterations, and modifications will be apparent to those skilled in the art. All such changes, substitutions, variations, alterations, and modifications fall within the scope of this specification.

In order to aid the United States Patent and Trademark Office (USPTO) and, any readers of any patent or publication flowing from this specification, the Applicant: (a) does not intend any of the appended claims to invoke paragraph (f) of 35 U.S.C. section 112, or its equivalent, as it exists on the date of the filing hereof unless the words "means for" or "steps for" are specifically used in the particular claims; and (b) does not intend, by any statement in the specification, to limit this disclosure in any way that is not otherwise expressly reflected in the appended claims, as originally presented or as amended.

What is claimed is:

1. A computer-implemented method, comprising:
    while a voice call is in progress, performing local analysis, comprising analyzing audio of the voice call on local hardware of a phone to identify indicia of deceit, and assigning the voice call a local reputation with a confidence;
    based on the confidence, supplementing local analysis with cloud-based analysis of call attributes; and
    after determining, based on the local analysis and cloud-based analysis, that the call is malicious, terminating the call while the call is in progress.

2. The method of claim 1, wherein performing the local analysis comprises operating a pre-trained machine learning (ML) model.

3. The method of claim 2, wherein performing local analysis comprises analyzing voice frequency of a caller.

4. The method of claim 2, wherein performing local analysis comprises analyzing words spoken during the call.

5. The method of claim 1, wherein performing the local analysis further comprises analyzing contextual data of the voice call.

6. The method of claim 5, wherein the contextual data comprise caller location.

7. The method of claim 5, wherein the contextual data comprise a telephone number that originated the call.

8. The method of claim 5, wherein the contextual data comprise apps operating on the phone concurrently with the call.

9. The method of claim 5, wherein the contextual data comprise receipt of a text message on the phone during the call.

10. The method of claim 5, wherein the contextual data comprise time of day.

11. The method of claim 1, wherein the call is an incoming call.

12. The method of claim 1, wherein the call is an outgoing call.

13. One or more tangible, nontransitory computer-readable storage media having stored thereon executable instructions to:
    while a voice call is in progress, perform local analysis, comprising analyzing audio of the voice call on local hardware of a phone to identify indicia of deceit, and assigning the voice call a local reputation with a confidence;
    based on the confidence, supplement local analysis with cloud-based analysis of call attributes; and
    after determining, based on the local analysis and cloud-based analysis, that the call is malicious, terminate the call while the call is in progress.

14. The one or more tangible, nontransitory computer-readable storage media of claim 13, wherein performing the local analysis comprises operating a pre-trained machine learning (ML) model.

15. The one or more tangible, nontransitory computer-readable storage media of claim 14, wherein performing local analysis comprises analyzing voice frequency of a caller.

16. The one or more tangible, nontransitory computer-readable storage media of claim 14, wherein performing local analysis comprises analyzing words spoken during the call.

17. The one or more tangible, nontransitory computer-readable storage media of claim 13, wherein performing the local analysis further comprises analyzing contextual data of the voice call.

18. The one or more tangible, nontransitory computer-readable storage media of claim 13, wherein the call is an incoming call or an outgoing call.

19. A computing apparatus, comprising:
    a processor circuit and a memory; and
    instructions encoded within the memory to instruct the processor circuit to:
        while a voice call is in progress, perform local analysis, comprising analyzing audio of the voice call on local hardware of a phone to identify indicia of deceit, and assigning the voice call a local reputation with a confidence;
        based on the confidence, supplement local analysis with cloud-based analysis of call attributes; and
        after determining, based on the local analysis and cloud-based analysis, that the call is malicious, terminate the call while the call is in progress.

20. The computing apparatus of claim 19, wherein performing the local analysis comprises operating a pre-trained machine learning (ML) model.

* * * * *